US011550533B2

(12) United States Patent
Yamaguchi

(10) Patent No.: US 11,550,533 B2
(45) Date of Patent: Jan. 10, 2023

(54) DISPLAY CONTROL FOR DISPLAY OF STATUS OF ANOTHER APPARATUS, AND METHOD, DISPLAY DEVICE, AND DISPLAY CONTROL SYSTEM

(71) Applicant: CANON KABUSHIKI KAISHA, Tokyo (JP)

(72) Inventor: Sayuri Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/943,698

(22) Filed: Jul. 30, 2020

(65) Prior Publication Data
US 2021/0042082 A1 Feb. 11, 2021

(30) Foreign Application Priority Data

Aug. 9, 2019 (JP) .............................. JP2019-147556

(51) Int. Cl.
*G06F 3/14* (2006.01)
*H04N 1/00* (2006.01)
(52) U.S. Cl.
CPC ....... *G06F 3/1454* (2013.01); *H04N 1/00129* (2013.01); *H04N 1/00244* (2013.01); *H04N 1/00464* (2013.01); *H04N 1/00477* (2013.01)
(58) Field of Classification Search
None
See application file for complete search history.

(56) References Cited

U.S. PATENT DOCUMENTS

| | | | | |
|---|---|---|---|---|
| 2005/0219638 A1* | 10/2005 | Kasamatsu | ........ | H04N 1/00384 358/406 |
| 2008/0259405 A1* | 10/2008 | Nishikawa | ......... | H04N 1/00623 358/401 |
| 2009/0262379 A1* | 10/2009 | Miyake | ................ | G03G 15/502 358/1.13 |
| 2010/0033748 A1* | 2/2010 | Enami | .................... | G09G 5/391 358/1.13 |
| 2013/0329253 A1* | 12/2013 | Sasaki | ................ | H04N 1/00222 358/1.15 |
| 2014/0063547 A1* | 3/2014 | Sakurai | .............. | H04N 1/00233 358/1.15 |
| 2016/0188263 A1* | 6/2016 | Sueishi | ................. | G06F 3/1253 358/1.15 |
| 2018/0005603 A1* | 1/2018 | Saroor | ..................... | G09G 5/14 |

FOREIGN PATENT DOCUMENTS

JP 2017-170832 9/2017

* cited by examiner

*Primary Examiner* — Mohammad H Ghayour
*Assistant Examiner* — Pawan Dhingra
(74) *Attorney, Agent, or Firm* — Venable LLP

(57) ABSTRACT

A display control method of controlling display contents on multiple display devices each capable of displaying a screen concerning an image formation apparatus includes the steps of obtaining an apparatus status of the image formation apparatus, and determining the display contents to be displayed on the display device employed by a user different from a user who inputs an instruction to transition to the obtained apparatus status, the display contents being determined in accordance with the obtained apparatus status.

15 Claims, 21 Drawing Sheets

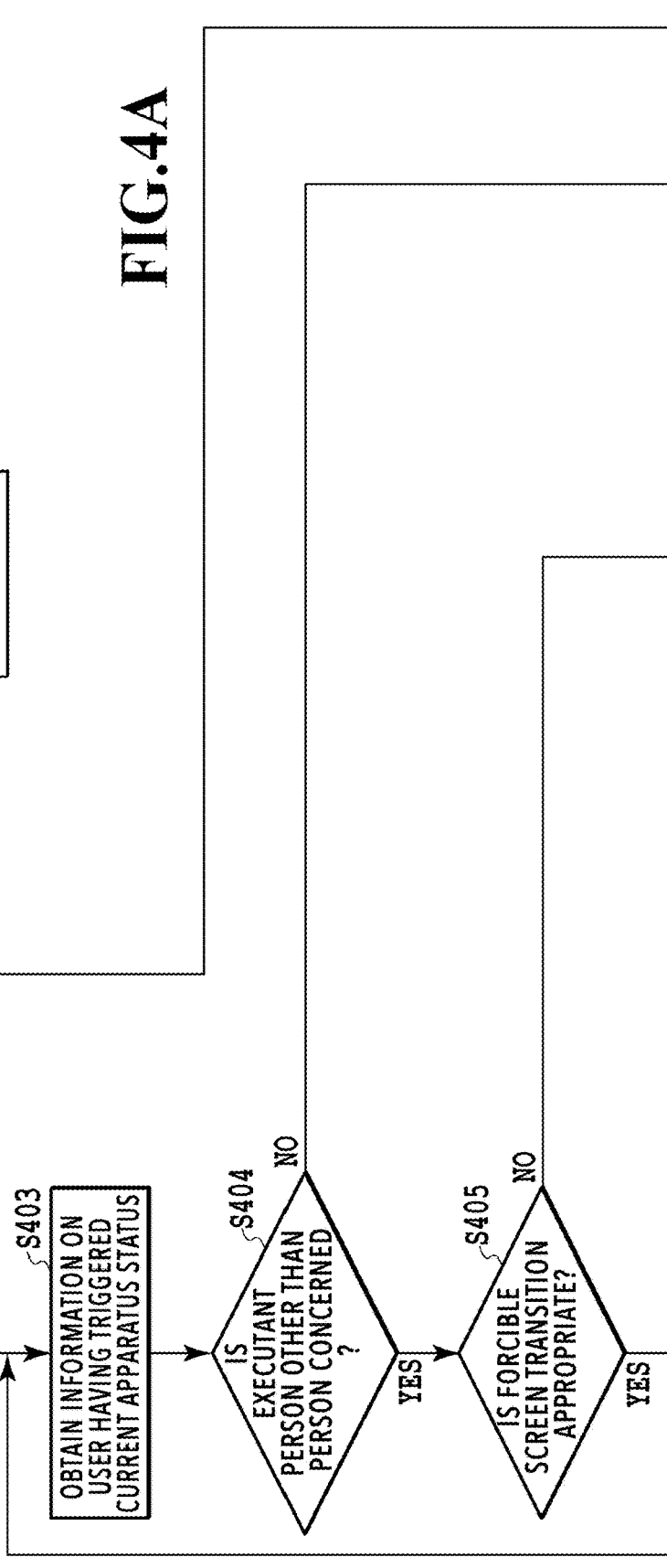

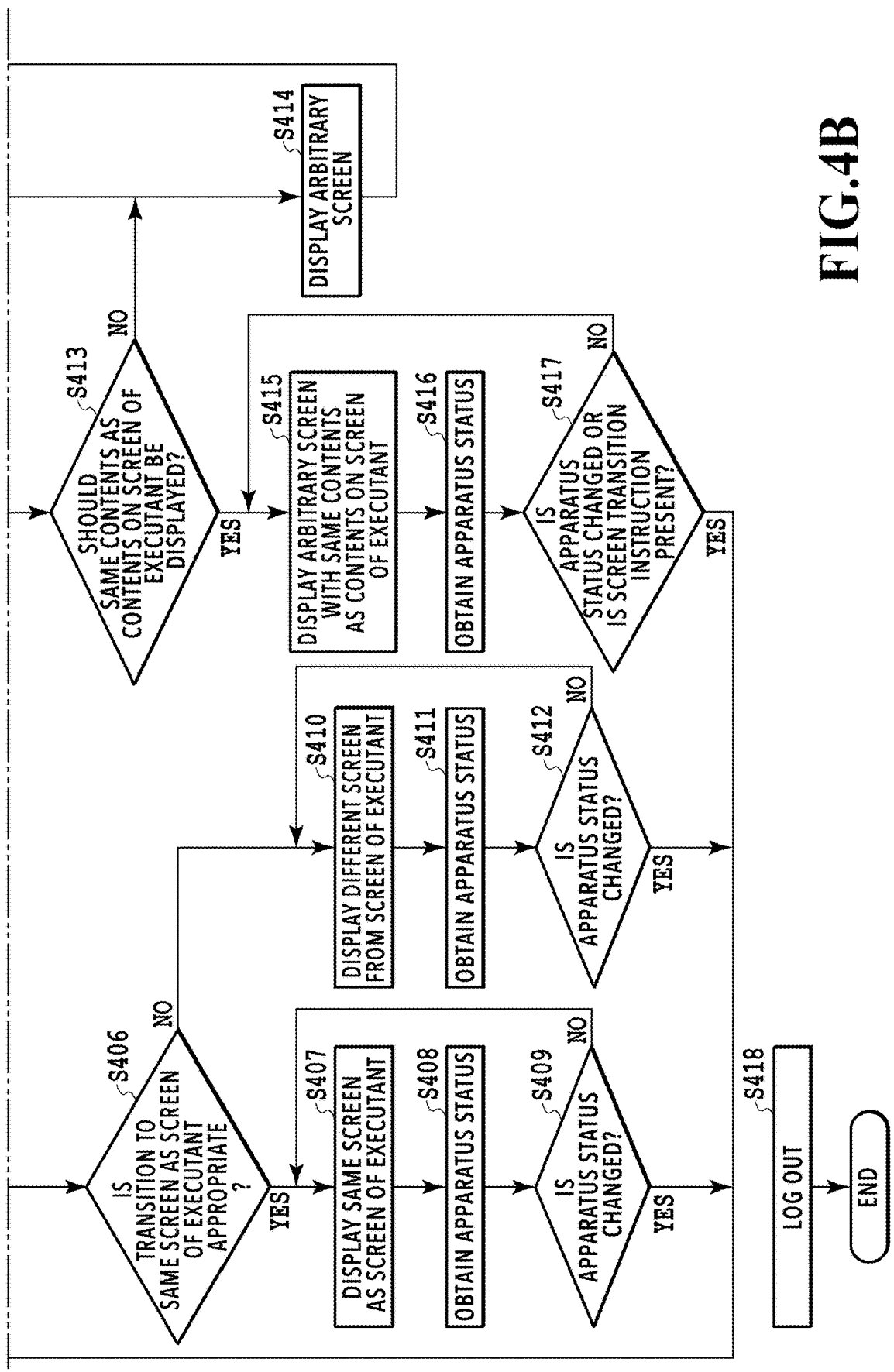

| CATEGORY | FORCIBLE TRANSITION | TRANSITION DESTINATION |
|---|---|---|
| A | YES | DIFFERENT SCREEN FROM SCREEN OF EXECUTANT |
| B | YES | SAME SCREEN AS SCREEN OF EXECUTANT |
| C | NO | SAME SCREEN AS SCREEN OF EXECUTANT WHEN MANUAL TRANSITION IS CONDUCTED |

FIG.5

| APPARATUS STATUS | CATEGORY | SCREEN INFORMATION |
|---|---|---|
| COMPONENT REPLACING | A | UNUSABLE SCREEN |
| SHUTTING DOWN | B | SHUTTING DOWN SCREEN |
| FIRMWARE UPDATING | B | FIRMWARE UPDATING SCREEN |
| IMAGE QUALITY MAINTENANCE ONGOING | C | TRIGGER: IMAGE QUALITY MAINTENANCE START SCREEN<br>DISPLAY: IMAGE QUALITY MAINTENANCE ONGOING SCREEN |

FIG.6

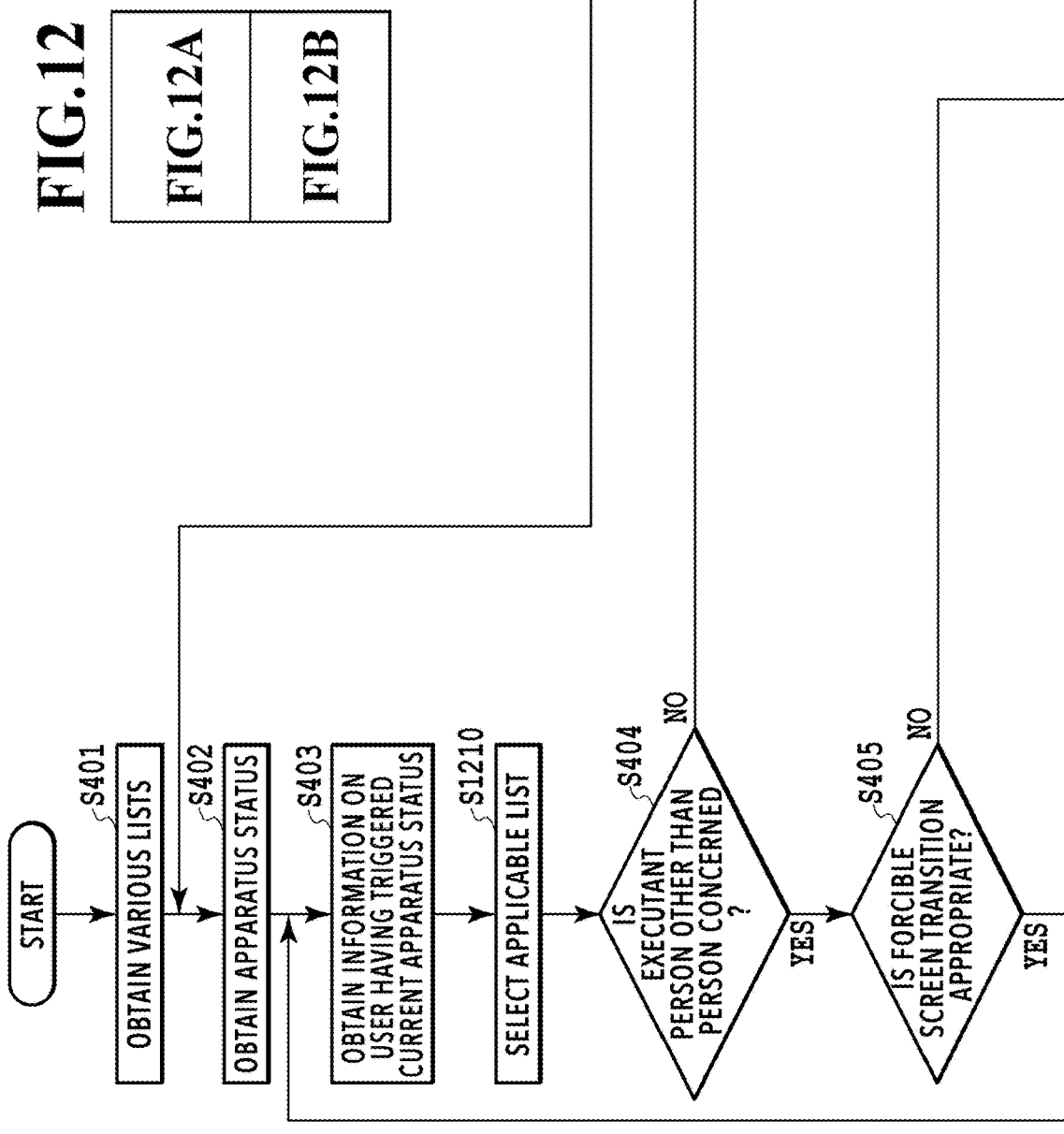

| APPARATUS STATUS | CATEGORY | SCREEN INFORMATION |
|---|---|---|
| COMPONENT REPLACING | A | UNUSABLE SCREEN (COMPONENT REPLACING) |
| SHUTTING DOWN | A | UNUSABLE SCREEN (SHUTTING DOWN) |
| FIRMWARE UPDATING | A | UNUSABLE SCREEN (FIRMWARE UPDATING) |
| IMAGE QUALITY MAINTENANCE ONGOING | A | UNUSABLE SCREEN (IMAGE QUALITY MAINTENANCE ONGOING) |

FIG.13

| APPARATUS STATUS | NON-EXECUTANT: REMOTE UI USER | | NON-EXECUTANT: MAIN UI USER | |
|---|---|---|---|---|
| | CATEGORY | SCREEN INFORMATION | CATEGORY | SCREEN INFORMATION |
| COMPONENT REPLACING | A | UNUSABLE SCREEN | C | TRIGGER: COMPONENT REPLACEMENT START SCREEN DISPLAY: COMPONENT REPLACING SCREEN |
| SHUTTING DOWN | B | SHUTTING DOWN SCREEN | C | TRIGGER: SHUTDOWN START SCREEN DISPLAY: SHUTTING DOWN SCREEN |
| FIRMWARE UPDATING | B | FIRMWARE UPDATING SCREEN | C | TRIGGER: FIRMWARE UPDATE START SCREEN DISPLAY: FIRMWARE UPDATING SCREEN |
| IMAGE QUALITY MAINTENANCE ONGOING | C | TRIGGER: IMAGE QUALITY MAINTENANCE START SCREEN DISPLAY: IMAGE QUALITY MAINTENANCE ONGOING SCREEN | C | TRIGGER: IMAGE QUALITY MAINTENANCE START SCREEN DISPLAY: IMAGE QUALITY MAINTENANCE ONGOING SCREEN |

FIG.14

| APPARATUS STATUS | CLOSER TO APPARATUS AS COMPARED TO EXECUTANT | | FARTHER FROM APPARATUS AS COMPARED TO EXECUTANT | |
|---|---|---|---|---|
| | CATEGORY | SCREEN INFORMATION | CATEGORY | SCREEN INFORMATION |
| COMPONENT REPLACING | B | COMPONENT REPLACING SCREEN | A | UNUSABLE SCREEN (COMPONENT REPLACING) |
| SHUTTING DOWN | B | SHUTTING DOWN SCREEN | A | UNUSABLE SCREEN (SHUTTING DOWN) |
| FIRMWARE UPDATING | B | FIRMWARE UPDATING SCREEN | A | UNUSABLE SCREEN (FIRMWARE UPDATING) |
| IMAGE QUALITY MAINTENANCE ONGOING | B | IMAGE QUALITY MAINTENANCE ONGOING SCREEN | A | UNUSABLE SCREEN (IMAGE QUALITY MAINTENANCE ONGOING) |

FIG.16

|  | NON-EXECUTANT CLOSEST TO EXECUTANT | | REST OF NON-EXECUTANTS | |
|---|---|---|---|---|
| APPARATUS STATUS | CATEGORY | SCREEN INFORMATION | CATEGORY | SCREEN INFORMATION |
| COMPONENT REPLACING | B | COMPONENT REPLACING SCREEN | A | UNUSABLE SCREEN (COMPONENT REPLACING) |
| SHUTTING DOWN | B | SHUTTING DOWN SCREEN | A | UNUSABLE SCREEN (SHUTTING DOWN) |
| FIRMWARE UPDATING | B | FIRMWARE UPDATING SCREEN | A | UNUSABLE SCREEN (FIRMWARE UPDATING) |
| IMAGE QUALITY MAINTENANCE ONGOING | B | IMAGE QUALITY MAINTENANCE ONGOING SCREEN | A | UNUSABLE SCREEN (IMAGE QUALITY MAINTENANCE ONGOING) |

FIG.17

| ITEM | | USER INFORMATION |
|---|---|---|
| USER ID | | 0001 |
| TYPE | | MAIN UI |
| POSITIONAL INFORMATION | ABSOLUTE POSITION | xx:xx:xx:xx |
| | DISTANCE FROM APPARATUS | xx.xxx m |
| EMPLOYED DEVICE | | TABLET |
| USER LEVEL | | LEVEL 3 |

FIG.18

DISPLAY CONTROL FOR DISPLAY OF STATUS OF ANOTHER APPARATUS, AND METHOD, DISPLAY DEVICE, AND DISPLAY CONTROL SYSTEM

BACKGROUND OF THE INVENTION

Field of the Invention

This disclosure is related to a display control method, a display device, and a display control system.

Description of the Related Art

There is a system that enables multiple users to use functions of a given apparatus simultaneously through multiple display interfaces. In this system, the respective users are basically capable of switching display contents on the respective display interfaces so that each user can use the functions of the apparatus through each corresponding display interface.

Japanese Patent Laid-Open No. 2017-170832 (hereinafter referred to as Document 1) discloses a print control device employed by multiple users through respective user interface screens. Document 1 discloses the following technique. Specifically, in a case where an operation currently regulated is accepted on an interface screen, acceptance of operation input of an item related to the regulated operation is regulated, and the interface screen notifies a user of the fact that the operated item is a regulated item.

SUMMARY OF THE INVENTION

However, the technique according to Document 1 cannot flexibly control display contents depending on a status of the apparatus. In a case where the apparatus is shut down after completion of a certain task by way of an operation of a person who executes a function, for example, it is desirable to share a status of execution of the function among users including those who are not executing the function. However, the technique according to Document 1 cannot flexibly control the display contents depending on the apparatus status.

A display control method according to an aspect of this disclosure provides a display control method of controlling a display content on a display device capable of displaying a screen concerning an apparatus, which includes the steps of obtaining an apparatus status of the apparatus, and determining the display content to be displayed on the display device. In a case where an instruction to transition to the obtained apparatus status is inputted from a different device from the display device, the determining step includes determining the display content to be displayed on the display device in accordance with the obtained apparatus status.

Further features of the present invention will become apparent from the following description of exemplary embodiments with reference to the attached drawings.

BRIEF DESCRIPTION OF THE DRAWINGS

FIG. 4 is a diagram showing the relationship of FIGS. 4A and 4B.

FIGS. 4A and 4B are totally a flowchart of processing to determine display contents to be displayed on a UI screen of a display device.

FIG. 5 is a category list for automatically switching the display contents on the UI screen.

FIG. 6 is a correspondence list of apparatus statuses to categories.

FIG. 9 is a diagram showing the relationship of FIGS. 9A and 9B.

FIG. 12 is a diagram showing the relationship of FIGS. 12A and 12B

FIGS. 12A and 12B are totally a flowchart of processing to determine display contents to be displayed on the UI screen of the display device.

FIG. 13 is a correspondence list of apparatus statuses to categories in a case where the executant is a main UI user.

FIG. 14 is a correspondence list of apparatus statuses to categories in a case where the executant is a remote UI user.

FIG. 16 is a correspondence list of the apparatus statuses depending on positions of users from the apparatus to the categories.

FIG. 17 is a correspondence list of the apparatus statuses depending on the position of the executant from the apparatus to the categories.

FIG. 18 is a diagram showing an example of user information.

DESCRIPTION OF THE EMBODIMENTS

Preferred embodiments of this disclosure will be exemplarily described below with reference to the accompanying drawings. In each of the drawings, arrows X and Y indicate horizontal directions that are orthogonal to each other. An arrow Z indicates a vertical direction. It is to be noted, however, that descriptions of relative arrangements, device shapes, and other features in this embodiment represent mere examples and do not intend to limit the scope of this disclosure only to those features. In this disclosure, an "image formation apparatus" is not limited only to a dedicated apparatus specialized in a printing function but also encompasses a multifunction apparatus that combines the printing function with other functions, a manufacturing apparatus that forms an image or a pattern on printing paper, and so forth.

First Embodiment

<Image Formation Apparatus>

Figure 1:
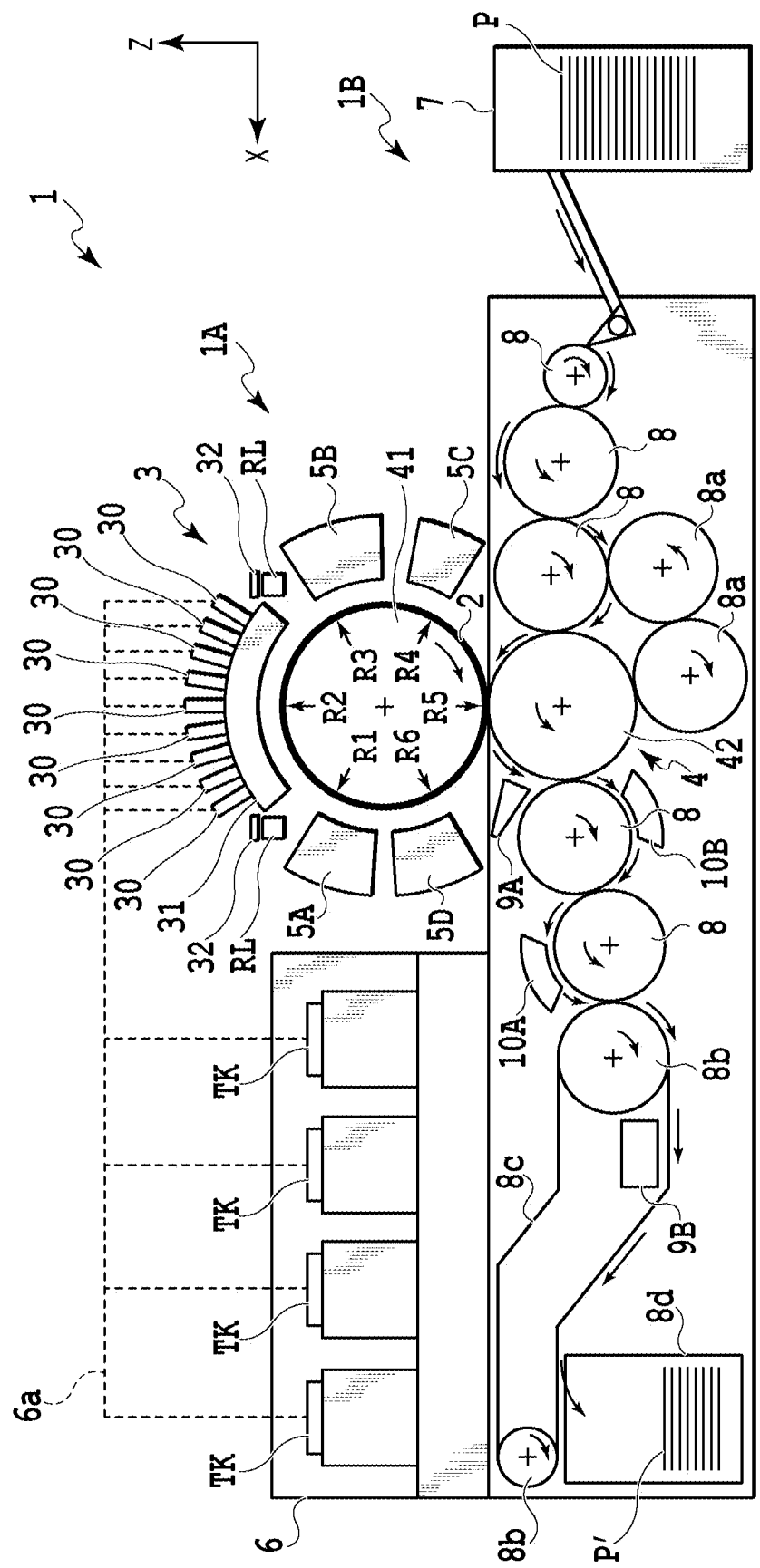
FIG. 1 is a schematic diagram an image formation apparatus.

FIG. 1 is a front view schematically showing an image formation apparatus 1 according to this embodiment. The image formation apparatus 1 is a sheet-fed inkjet printer which produces a printed subject P' by transferring ink images onto a printing medium P through a transfer body 2.

The image formation apparatus 1 includes a printing device 1A and a conveyance device 1B. In this embodiment, X direction, Y direction, and Z direction represent a width direction (an overall length direction), a depth direction, and a height direction of the image formation apparatus 1, respectively. The printing medium P is conveyed in the X direction.

Note that the term "printing" includes not only a case of forming significant information such as characters and shapes, but also a case of forming images, figures, patterns, and the like broadly on the printing medium regardless of whether they are significant or insignificant as well as a case of processing a medium. Moreover, such printing outcomes do not necessarily have to be visible to human eyes. Although the "printing medium" is assumed to be sheet-shaped cut paper in this embodiment, the printing medium may be formed from a cloth, a plastic film, or the like.

Ingredients of inks are not limited. Nonetheless, this embodiment assumes a case of using aqueous pigment inks each containing a pigment serving as a coloring material, water, and a resin.

<Printing Device>

The printing device 1A will be described to begin with. The printing device 1A includes a printing unit 3, a transfer unit 4, peripheral units 5A to 5D, and a supply unit 6.

<Printing Unit>

Figure 2:
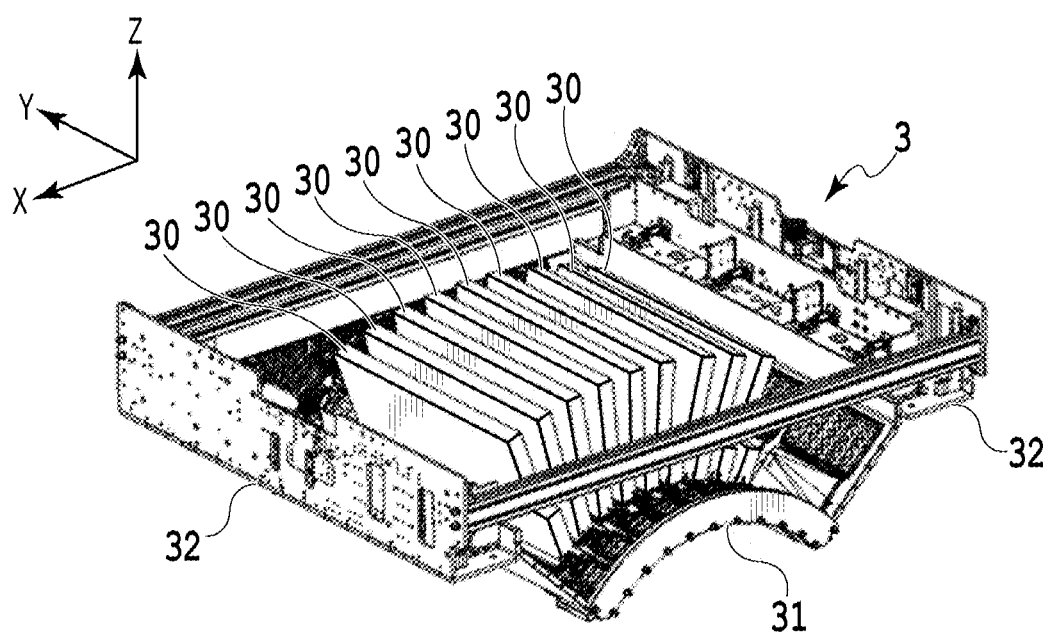
FIG. 2 is a perspective view of a printing unit.

The printing unit 3 includes multiple printing heads 30 and a carriage 31. The printing unit 3 will now be described with reference to FIGS. 1 and 2. FIG. 2 is a perspective view of the printing unit 3. Each printing head 30 ejects a liquid ink onto the transfer body 2 and forms an ink image corresponding to a printed image on the transfer body 2.

In this embodiment, each printing head 30 is a full-line head extended in the Y direction, in which nozzles are arranged across a range that covers an entire width of an image printing region of a printing medium in a maximum usable size. An ink ejection surface where the nozzles are open is provided to a lower surface of the printing head 30, and the ink ejection surface is opposed to a surface of the transfer body 2 with a small clearance (such as several millimeters) in between. In this embodiment, the transfer body 2 is configured to move on a circular orbit in a circulating manner. For this reason, the printing heads 30 are radially arranged.

Each nozzle is provided with an ejection element. The ejection element is an element that ejects the ink in the nozzle by generating a pressure inside the nozzle, for example, and publicly known techniques for an inkjet head in an inkjet printer are applicable thereto. Examples of such an ejection element include an element that brings an ink into film boiling with an electrothermal transducer and ejects the ink by using a bubble thus generated, an element that ejects an ink by using an electromechanical transducer, an element that ejects an ink by using static electricity, and the like. The ejection element adopting the electrothermal transducer can be favorably used in light of high-speed and high-density printing.

Nine printing heads 30 are provided in this embodiment. The respective printing heads 30 eject inks of different types from one another. The inks of different types are inks containing different coloring materials, for instance, which include a yellow ink, a magenta ink, a cyan ink, a black ink, and so forth. In this embodiment, each printing head 30 is configured to eject one type of such an ink. However, each printing head 30 may be configured to eject two or more types of inks. In the case where the multiple printing heads 30 are provided as described above, part of those printing heads 30 may eject an ink not containing any coloring materials (such as a clear ink).

The carriage 31 supports the multiple printing heads 30. In each printing head 30, an end portion on the ink ejection surface side is fixed to the carriage 31. This makes it possible to precisely maintain the clearance between the ink ejection surface and the surface of the transfer body 2. The carriage 31 is configured to be displaceable while loading the printing heads 30 by means of guidance of guiding members RL. In this embodiment, the guiding members RL are rail members extending in the Y direction and a pair of the guiding members RL are provided separately from each other in the X direction. A sliding member 32 is provided to each side portion in the X direction of the carriage 31. These sliding members 32 are engaged with the guiding members RL and slide in the Y direction along the guiding members RL.

<Transfer Unit>

The transfer unit 4 will be described with reference to FIG. 1. The transfer unit 4 includes a transfer cylinder 41 and an impression cylinder 42. These cylinders are rotating bodies that rotate around rotation axes in the Y direction, and each cylinder has an outer peripheral surface of a cylindrical shape. In FIG. 1, arrows illustrated inside the forms of the transfer cylinder 41 and the impression cylinder 42 indicate rotating directions of these cylinders. Specifically, the transfer cylinder 41 rotates clockwise and the impression cylinder 42 rotates counterclockwise.

The transfer cylinder 41 is a supporting body that supports the transfer body 2 on its outer peripheral surface. The transfer body 2 is provided on the outer peripheral surface of the transfer cylinder 41 either continuously or intermittently in a circumferential direction. In the case where the transfer body 2 is continuously provided, the transfer body 2 is formed into an endless belt shape. In the case where the transfer body 2 is intermittently provided, the transfer body 2 is formed into an ended belt shape split into multiple segments. The respective segments can be arranged into arc shapes at equal pitches on the outer peripheral surface of the transfer cylinder 41.

The transfer body 2 moves on the circular orbit in a circulating manner by means of rotation of the transfer cylinder 41. Based on rotational phases of the transfer cylinder 41, positions on the transfer body 2 can be divided into a pre-ejection processing region R1, an ejection region R2, a post-ejection processing region R3, another post-ejection processing region R4, a transfer region R5, and a post-transfer processing region R6. The transfer body 2 passes through these regions in a circulating manner.

The pre-ejection processing region R1 is a region where pre-processing on the transfer body 2 is carried out prior to ejection of the inks from the printing unit 3, which is a region where the processing is conducted by the peripheral unit 5A. In this embodiment, a reaction liquid is applied in this region. The ejection region R2 is a region where the printing unit 3 ejects the inks onto the transfer body 2 to form the ink images. The post-ejection processing region R3 and the post-ejection processing region R4 are regions where processing on the ink images is carried out after ejection of the inks. The post-ejection processing region R3 is a region where the processing is conducted by the peripheral unit 5B. The post-ejection processing region R4 is a region where the processing is conducted by the peripheral unit 5C. The transfer region R5 is a region where the ink images on the transfer body 2 are transferred to the printing medium P by using the transfer unit 4. The post-transfer processing region R6 is a region where post-processing on the transfer body 2 is carried out after the transfer, which is a region where the processing is conducted by the peripheral unit 5D.

In this embodiment, the ejection region R2 is a region that has a predetermined zone. Zones in the rest of the regions R1 and R3 to R6 each have a shorter zone as compared to that in the ejection region R2. Comparing the regions to a clock face, the pre-ejection processing region R1 is located at about 10 o'clock. The ejection region R2 is located in a range from 11 to 1 o'clock. The post-ejection processing region R3 is located at about 2 o'clock. The post-ejection processing region R4 is located at about 4 o'clock. The transfer region R5 is located at about 6 o'clock. The post-transfer processing region R6 is located at about 8 o'clock.

The transfer body 2 may be formed from a single layer or from a stacked body including multiple layers. In the case where the transfer body 2 is formed from multiple layers, the transfer body 2 may include three layers of a surface layer, an elastic layer, and a compression layer. The surface layer is the outermost layer provided with an image formation surface where the ink images are formed. As a consequence of providing the compression layer, it is possible to allow the compression layer to absorb deformations, to disperse a local pressure variation, and to maintain transferability even during high-speed printing. The elastic layer is a layer located between the surface layer and the compression layer.

While various materials including a resin, a ceramic, and the like can be used as the material of the surface layer, a material having a high compressive elastic modulus can be preferably used in light of durability. Specific examples of such materials include acrylic resin, acrylic silicone resin, fluorine-containing resin, and a condensate obtained by condensing a hydrolytic organic silicon compound. The surface layer may be subjected to a surface treatment in order to increase wettability of the reaction liquid, image transferability, and so forth. Examples of the surface treatment include a flame treatment, a corona treatment, a plasma treatment, a polishing treatment, a roughening treatment, an active energy ray irradiation treatment, an ozone treatment, a surfactant treatment, a silane coupling treatment, and the like. Two or more of these treatments may be combined as appropriate. In the meantime, it is also possible to provide the surface layer with a desired surface profile.

Examples of the material of the compression layer include acrylonitrile-butadiene rubber, acrylic rubber, polychloroprene rubber, urethane rubber, silicone rubber, and the like. In the case of molding any of these rubber materials, the material may be formed into a porous rubber material by blending a prescribed amount of any of a vulcanizing agent, a vulcanization accelerator, and the like, and also blending a foaming agent, hollow particles, or a filler such as salt as appropriate. Thus, bubble portions in the rubber are compressed with a volume change in response to various changes in pressure, whereby deformations in directions other than the direction of compression are reduced. As a consequence, the rubber material can achieve transferability and durability more stably. The porous rubber material may adopt any one of or a combination of a continuous pore structure in which the pores are continuous with one another, and a closed pore structure in which the pores are isolated from one another.

While various materials including a resin, a ceramic, and the like can be used as the material of the elastic layer, various elastomer materials or rubber materials can be preferably used in light of processing characteristics. Specific examples of such materials include fluorosilicone rubber, phenyl silicone rubber, fluorine-containing rubber, polychloroprene rubber, urethane rubber, nitrile rubber, and the like. More examples thereof include ethylene propylene rubber, natural rubber, styrene rubber, isoprene rubber, butadiene rubber, ethylene-propylene-butadiene copolymer, nitrile butadiene rubber, and the like. In particular, any of silicone rubber, fluorosilicone rubber, and phenyl silicone rubber has a low compression set and is therefore advantageous in terms of dimensional stability and durability. Each of these three materials exhibits a low change in elastic modulus with the temperature and is also advantageous in terms of transferability.

It is also possible to use one of various adhesives or a two-sided adhesive tape between the surface layer and the elastic layer as well as between the elastic layer and the compression layer in order to fix these layers. Meanwhile, the transfer body 2 may contain a reinforcing layer having a high compressive elastic modulus in order to suppress lateral expansion in the case of attaching the transfer body 2 to the transfer cylinder 41 and in order to retain resilience. Here, the reinforcing layer may be formed from a fabric. The transfer body 2 may be formed by combining any of the layers formed from the above-described materials as appropriate.

The outer peripheral surface of the impression cylinder 42 is pressed against the transfer body 2. The outer peripheral surface of the impression cylinder 42 is provided with at least one gripping mechanism that grips a tip end of the printing medium P. Two or more gripping mechanisms may be provided away from one another in the circumferential direction of the impression cylinder 42. The printing medium P is conveyed in a close contact with the outer peripheral surface of the impression cylinder 42 and the ink images on the transfer body 2 are transferred to the printing medium P as the printing medium P is passed through a nipping portion between the impression cylinder 42 and the transfer body 2.

<Peripheral Units>

The peripheral units 5A to 5D are arranged around the transfer cylinder 41. In this embodiment, the peripheral units include an application unit 5A, an absorption unit 5B, a heating unit 5C, and a cleaning unit 5D.

The application unit 5A is a mechanism that applies the reaction liquid onto the transfer body 2 before the ejection of the inks from the printing unit 3. The reaction liquid is a liquid containing a component that increases a viscosity of each ink. Here, the increase in viscosity of the ink means that the coloring material, the resin, and the like constituting the ink and the component that increases the viscosity of the ink come into contact with each other and develop a chemical reaction or a physical adsorption, thereby bringing about an increase in viscosity of the ink. The increase in viscosity of the ink includes not only a case of bringing about the increase in viscosity of the entire ink but also a case of causing an increase in viscosity locally as a consequence of partial flocculation of the component constituting the ink such as the coloring material and the resin.

The component that increases the viscosity of the ink is not limited to particular materials and may adopt metallic ions, polymer flocculants, and the like. Here, a substance such as an organic acid which flocculates the coloring material in the ink by causing a pH change of the ink can be preferably used. Examples of an application mechanism for the reaction liquid include a roller, a printing head, a die coating device (a die coater), a blade coating device (a blade coater), and the like. By applying the reaction liquid to the transfer body 2 before ejecting the inks, the inks that reach the transfer body 2 can be fixed immediately. Thus, it is possible to suppress bleeding in which the adjacent inks get mixed with each other.

The absorption unit 5B is a mechanism that absorbs a liquid component from the ink images on the transfer body 2 before the transfer. Blurs and other problems of the images printed on the printing medium P can be suppressed by absorbing and reducing the liquid component in the ink images. From a different point of view, the reduction of the liquid component can also be expressed as condensation of the inks that constitute the ink images on the transfer body 2. The condensation of the ink means that a percentage of solid contents such as the coloring material and the resin in the ink relative to the liquid component therein is increased as a consequence of the reduction of the liquid component contained in the ink.

The absorption unit 5B includes a liquid absorbing member that comes into contact with the ink images and reduces the amount of the liquid component in the ink images, for example. The liquid absorbing member may be formed on the outer peripheral surface of the roller. Alternatively, the liquid absorbing member may be formed into an endless sheet and fed in a circulating manner. In light of protection of the ink images, a traveling velocity of the liquid absorbing member may be set equal to a circumferential velocity of the transfer body 2 so as to move the liquid absorbing member synchronously with the transfer body 2.

The liquid absorbing member may include a porous body that comes into contact with the ink images. In order to suppress adhesion of the solid contents in the ink to the liquid absorbing member, a pore size on a surface of the porous body that comes into contact with the ink images may be set equal to or below 10 µm. Here, the pore size means an average diameter that can be measured in accordance with publicly known methods such as a mercury intrusion method, a nitrogen adsorption method, and an SEM image observation method. Here, the liquid component is not limited to a particular component as long as the component is amorphous and mobile, and has a substantially constant volume. Examples of the liquid component include water, an organic solvent, and the like contained in the ink and the reaction liquid.

The heating unit 5C is a mechanism that heats the ink images on the transfer body 2 before the transfer. By heating the ink images, the resin in the ink images is fused so as to improve transferability to the printing medium P. A heating temperature can be set equal to or above a minimum film-forming temperature (MFT) of the resin. The MFT can be measured in accordance with generally known methods such as methods using respective devices based on JIS K 6828-2:2003 or ISO 2115:1996. From the viewpoints of transferability and image fastness, the ink images may be heated at a temperature that is higher by at least 10° C. than the MFT or higher by at least 20° C. than the MFT. The heating unit 5C may adopt one of publicly known heating devices including various lamps such as infrared lamps, a fan heater, and the like. Here, an infrared heater can be preferably used in light of heating efficiency.

The cleaning unit 5D is a mechanism that cleans the transfer body 2 after the transfer. The cleaning unit 5D removes the inks remaining on the transfer body 2 as well as dusts and the like on the transfer body 2. The cleaning unit 5D may adopt publicly known methods as appropriate. Examples of such methods include a method of bringing a porous member into contact with the transfer body 2, a method of scraping off the surface of the transfer body 2 with a brush, and a method of squeegeeing the surface of the transfer body 2 with a blade. Meanwhile, a cleaning member used for the cleaning may adopt publicly known shapes such as a roller shape and a web shape.

As described above, this embodiment includes the application unit 5A, the absorption unit 5B, the heating unit 5C, and the cleaning unit 5D as the peripheral units. Here, one of these units may be provided with a function to cool the transfer body 2, or a cooling unit may be additionally provided. In this embodiment, the temperature of the transfer body 2 may rise due to the heat from the heating unit 5C. The performance of the absorption unit 5B to absorb the liquid component may be deteriorated in a case where the ink images exceed the boiling point of water serving as a prime solvent of the inks after the inks are ejected from the printing unit 3 onto the transfer body 2. The performance to absorb the liquid component can be maintained by cooling the transfer body 2 in such a way as to keep the temperatures of the ejected inks below the boiling point of water.

The cooling unit may be a blowing mechanism that blows air to the transfer body 2 or may be a mechanism that brings a member (such as a roller) into contact with the transfer body 2 and cools this member with air or water. Alternatively, the cooling unit may be a mechanism that cools the cleaning member of the cleaning unit 5D. Timing for cooling may be set during a period after the transfer and before the application of the reaction liquid.

<Supply Unit>

The supply unit 6 is a mechanism that supplies the inks to the respective printing heads 30 in the printing unit 3. The supply unit 6 may be provided on a rear side of the image formation apparatus 1. The supply unit 6 includes storage portions TK that store the inks separately depending on the types of the inks. The storage portions TK may be formed from main tanks and sub tanks. Each storage portion TK and the corresponding printing head 30 communicate with each other through a flow channel 6a. The ink is supplied from the storage portion TK to the printing head 30. The flow channel 6a may be a flow channel configured to circulate the ink between the storage portion TK and the printing head 30, and the supply unit 6 may include pumps and the like for circulating the inks. A deaeration mechanism for deaerating the bubbles in the ink may be provided in the middle of the flow channel 6a or at the storage portion TK. A valve for adjusting a liquid pressure of the ink and an atmospheric pressure may be provided in the middle of the flow channel 6a or at the storage portion TK. Heights in the Z direction of the storage portion TK and the printing head 30 may be designed such that a liquid level of the ink inside the storage portion TK is located at a position lower than the ink ejection surface of the printing head 30.

<Conveyance Device>

The conveyance device 1B is a device that feeds the printing media P to the transfer unit 4 and discharges the printed subjects P' from the transfer unit 4 after the ink images are transferred to the printed subjects P'. The conveyance device 1B includes a feeding unit 7, multiple conveyance cylinders 8 and 8a, two sprockets 8b, a chain 8c, and a collection unit 8d. In FIG. 1, arrows inside the forms of respective constituents of the conveyance device 1B indicate rotating directions of these constituents and arrows on the outside thereof collectively indicate a conveyance path of the printing media P or the printed subjects P'. Each printing medium P is conveyed from the feeding unit 7 to the transfer unit 4 while each printed subject P' is conveyed from the transfer unit 4 to the collection unit 8d. The feeding unit 7 side may be referred to as an upstream side in the conveyance direction and the collection unit 8d side may be referred to as a downstream side in the conveyance direction as appropriate.

The feeding unit 7 includes a stacking unit that stacks the printing media P and also includes a feeding mechanism that feeds the printing media P one by one from the stacking unit to the conveyance cylinder 8 on the uppermost stream. Each of the conveyance cylinders 8 and 8a is a rotating body that rotates around the rotation axis in the Y direction, and has an outer peripheral face in a cylindrical shape. The outer peripheral surface of each of the conveyance cylinders 8 and 8a is provided with at least one gripping mechanism that grips the tip end of the printing medium P (or the printed subject P'). A gripping action and a releasing action of each gripping mechanism are controlled in such a way as to pass on the printing medium P between the adjacent conveyance cylinders.

The two conveyance cylinders 8a are conveyance cylinders used for reversing the printing medium P. In the case of double-sided printing (duplex printing) of the printing medium P, the printing medium P after being subjected to the transfer onto a top surface is passed on to the conveyance cylinder 8a instead of passing the printing medium P from the impression cylinder 42 on to the adjacent conveyance cylinder 8 on the downstream side. In this instance, the impression cylinder 42 keeps on gripping the tip end of the printing medium P by using the gripping mechanism, and continues rotation without passing the tip end of the printing medium P on to the conveyance cylinder 8a. Then, the releasing action of the gripping mechanism of the impression cylinder 42 takes place at the timing to pass a rear end of the printing medium P on to the gripping mechanism of the conveyance cylinder 8a adjacent to the impression cylinder 42. Thereafter, the printing medium P is turned over by way of the two conveyance cylinders 8a, and is passed on to the impression cylinder 42 again through the conveyance cylinder 8 on the upstream side of the impression cylinder 42. As a consequence, a back surface of the printing medium P is opposed to the transfer cylinder 41 and more ink images are transferred onto the back surface.

The chain 8c is wound around the two sprockets 8b. One of the two sprockets 8b is a driving sprocket and the other sprocket 8b is a driven sprocket. The chain 8c travels in a circulating manner by means of rotation of the driving sprocket. The chain 8c is provided with multiple gripping mechanisms located away from one another in a longitudinal direction thereof. Each gripping mechanism grips the end of the printed subject P'. The printed subject P' is passed on from the conveyance cylinder 8 located on a downstream end to the gripping mechanism of the chain 8c, then the printed subject P' gripped by the gripping mechanism is conveyed to the collection unit 8d along with the travel of the chain 8c, and then the grip is released. In this way, the printed subject P' is stacked on the inside of the collection unit 8d.

<Post-Processing Units>

The conveyance device 1B is provided with post-processing units 10A and 10B. The post-processing units 10A and 10B are mechanisms which are arranged downstream of the transfer unit 4 and configured to perform post-processing on each printed subject P'. The post-processing unit 10A performs processing on the top surface of the printed subject P' and the post-processing unit 10B performs processing on the back surface of the printed subject P'. The content of the processing may be coating of image printing surfaces of the printed subject P' for the purpose of protecting the images, calendaring the printed subject P', and the like. Examples of the content of the coating include application of a liquid, welding of a sheet, lamination, and so forth.

<Testing Units>

The conveyance device 1B is provided with testing units 9A and 9B. The testing units 9A and 9B are mechanisms which are arranged downstream of the transfer unit 4 and configured to perform testing on each printed subject P'.

In this embodiment, the testing unit 9A is an imaging device that captures the image printed on the printed subject P'. The testing unit 9A includes an image pickup element such as a CCD sensor and a CMOS sensor. The testing unit 9A captures the printed image during a printing operation which is continuously carried out. Based on the images captured by the testing unit 9A, it is possible to check changes in tonality in the printed image with time and to determine whether or not correction of image data or printing data should be carried out. In this embodiment, an image capturing range of the testing unit 9A is set to the outer peripheral surface of the impression cylinder 42, and the testing unit 9A is located at a position where it is possible to partially capture the printed image immediately after the transfer. The testing unit 9A may test all the printed images or test once every predetermined number of the media.

In this embodiment, the testing unit 9B is also an imaging device that captures the image printed on the printed subject P'. The testing unit 9B includes an image pickup element such as a CCD sensor and a CMOS sensor. The testing unit 9B captures the printed image during a test printing operation. The testing unit 9B captures the entire printed image. Based on the image captured by the testing unit 9B, the image formation apparatus 1 can conduct basic settings for various corrections concerning the printing data. In this embodiment, the testing unit 9B is located at a position to capture the printed subject P' being conveyed by the chain 8c. In the case where printed image is captured by the testing unit 9B, the travel of the chain 8c is temporarily stopped and the entire image is captured. The testing unit 9B may be a scanner configured to scan the printed subject P'.

<Control Unit>

Figure 3:
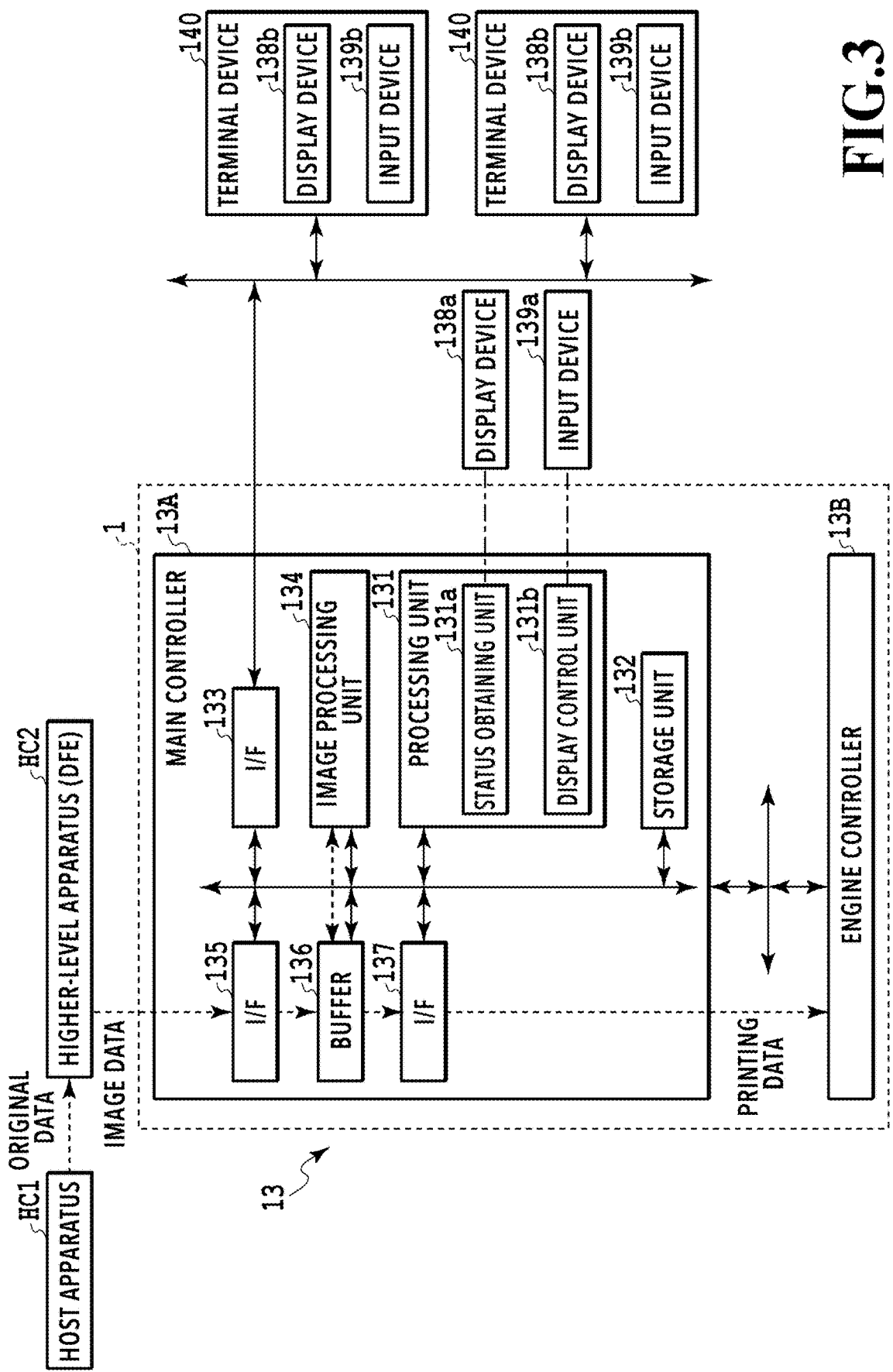
FIG. 3 is a block diagram of a control system in the image formation apparatus.

FIG. 3 is a block diagram of a control unit 13 of the image formation apparatus 1. Now, the control unit of the image formation apparatus 1 will be described below. The control unit 13 is communicably connected to a higher-level device (a digital front end or DFE) HC2. The higher-level apparatus HC2 is communicably connected to a host apparatus HC1.

Original data serving as a source of the printed image is created or saved in the host apparatus HC1. The original data in this case is created in the form of an electronic file such as a document file and an image file. The original data is transmitted to the higher-level apparatus HC2 and the original data received by the higher-level apparatus HC2 is converted into a data format (such as RGB data that expresses the image based on RGB) compatible with the control unit 13. The converted data is transmitted as the image data from the higher-level apparatus HC2 to the control unit 13, and the control unit 13 starts the printing operation (a printing operation) based on the received image data.

In this embodiment, the control unit 13 is broadly divided into a main controller 13A and an engine controller 13B. The main controller 13A includes a processing unit 131, a storage unit 132, a communication interface (I/F) 133, an image processing unit 134, a communication OF 135, a buffer 136, and a communication OF 137. Meanwhile, the processing unit 131 of the main controller 13A is connected to a display device 138a and an input device 139a.

The processing unit 131 is a processor such as a CPU which executes programs stored in the storage unit 132 and controls the entire main controller 13A. The storage unit 132 is a storage device such as a RAM, a ROM, a hard disk, and an SSD, which stores the programs to be executed by the processing unit 131 as well as the data and provides a work area to the processing unit 131. The processing unit 131 that controls the entire main controller 13A includes a status obtaining unit 131a that obtains statuses of the apparatus, and a display control unit 131b that controls display contents on the display device 138a. The display device 138a is a display unit such as a touch panel, a liquid crystal display unit, and a tablet. The display device 138a is a device that can display a user interface (UI) screen that depicts the display contents to be controlled by the display control unit 131b. The input device 139a is an input device such as a touch panel, a keyboard, and a mouse configured to accept user instructions.

The communication OF 133 communicates with other terminal devices 140. The communication OF 133 can communicate with the terminal devices 140 through a wired or wireless network. Each terminal device 140 is a device which can display a UI screen that depicts the display contents controlled by the display control unit 131b. The terminal device 140 may be formed from an electronic device (an information processing device) equipped with various hardware configurations including a CPU, a RAM, an SSD, and the like which are not illustrated in FIG. 3. The terminal device 140 includes a display device 138b which is equivalent to the display device 138a and an input device 139b which is equivalent to the input device 139a. Although FIG. 3 illustrates an example of providing two terminal devices 140, at least one terminal device 140 needs to be provided therein. The display device 138a and the display device 138b have the same functions and items common to these devices will be described below while omitting suffixes to the reference numerals. The same applies to the input device 139a and the input device 139b.

The image processing unit 134 is an electronic circuit provided with an image processor, for example. The buffer 136 is any of a RAM, a hard disk, and an SSD, for example. The communication OF 135 communicates with the higher-level apparatus HC2 while the communication OF 137 communicates with the engine controller 13B. Arrows with dashed lines in FIG. 3 show an example of a flow of image data processing. The image data from the higher-level apparatus HC2 received through the communication OF 135 is accumulated in the buffer 136. The image processing unit 134 reads the image data out of the buffer 136, subjects the read image data to prescribed image processing, and stores the processed data in the buffer 136 again. The image data subjected to the image processing and stored in the buffer 136 is transmitted as the printing data to be used by a print engine from the communication OF 137 to the engine controller 13B.

<Description of Display Control>

As shown in FIG. 3, a display control system of this embodiment includes the multiple display devices 138 (inclusive of the display device 138a and the display devices 138b of the terminal devices 140) for the single apparatus (the image formation apparatus 1). For this reason, multiple users can employ the individual display devices 138, respectively. In this embodiment, a user interface (UI) screen concerning the image formation apparatus 1 is displayed on each display device 138. For example, the processing unit 131 activates a Web server on the main controller 13A. Then, programs functioning as the status obtaining unit 131a and the display control unit 131b in the processing unit 131 and client programs of the respective display devices 138 exchange data through the Web server. For instance, each display device 138 includes a browser and the client program so that the display device 138 can use the browser to display the UI screen of the image formation apparatus 1 obtained through the Web server. In the case where the UI screen is displayed on each display device 138 through the Web server activated on the main controller 13A as described above, the same information can be displayed on the UI screens of all the display devices 138, for example. Alternatively, different information can be displayed on the UI screens of the respective display devices 138. To be more precise, it is possible to present the same information concerning the image formation apparatus 1 or to present different information to the respective users employing the display devices 138. Note that a single display device 138 can also activate multiple browsers. This enables multiple users or a single user to employ the single display device 138 while displaying multiple UI screens thereon.

If the client program used in the browser display of each display device 138 is configured to obtain information regularly from a server, then it is possible to update the display information as needed without requiring a user operation. Alternatively, it is also possible to update the display information by adopting a configuration in which the Web server side issues a notification to each display device 138 side (a client side) if there is an update of the information concerning the image formation apparatus 1, and the browser updates the information in response to this notification.

This embodiment will describe an example in which the processing unit 131 causes the browser of the display device 138 to display the UI screen of the image formation apparatus 1 by using a single-page application (SPA) method. The SPA is an application which switches the contents by using a single Web page without requiring page transition. In the SPA, the processing unit 131 transmits display sources (sources of the UI screens) for all pages to the display device 138 through the Web server at the time of initial access of the browser to the Web server. The transition of the UI screens thereafter is controlled on the display device 138 side.

For instance, a description will be given of an example in which a browser A and a browser B display the same UI screen (such as a maintenance screen). The display sources for the maintenance screen have already been transmitted to each display device 138 at the time of initial access. For this reason, no display sources are transmitted from the Web server in the case where each browser displays the maintenance screen anew. On the other hand, data necessary for displaying the maintenance screen (such as a value of progress percentage in the case of a screen that displays a progress of maintenance) is transmitted from the Web server (the processing unit 131) in response to a request from the client program in the display device 138. Regarding this request, the display device 138 may obtain the information regularly from the Web server or the Web server side may issue an update notification to the display device 138 so as to allow the display device 138 to update the information in response to the notification as discussed earlier.

As will be described later in detail, in this embodiment, the multiple users access the Web server (the processing unit 131) at the same time and the display contents are updated as needed. Accordingly, it is preferable to adopt the SPA from the viewpoint of reducing burdens on the Web server and the processing unit 131. Nonetheless, a mode of switching pages may be adopted instead of the SPA. In other words, the processing unit 131 may provide not only the update data but also the data including the display sources to each browser through the Web server as needed in response to a screen request from each display device 138.

In a case where a certain user executes a certain function of the image formation apparatus 1 through the UI screen displayed on the display device 138 in this embodiment, the user (or the relevant display device 138) becomes an "executant" of this function. Other users (or other display devices 138) become "non-executants" of this function. Regarding the screen display during the execution of the function, there are a case where the contents to be displayed should be the same between the executant and the non-executant, a case where the contents to be displayed should be different between the executant and the non-executant, and so forth. This embodiment will describe an example of setting the display contents on the UI screen of the non-executant as the same as or different from the display contents on the UI screen of the executant depending on the function being executed.

<Description of Outlines in FIGS. 4A to 6>

FIGS. 4A and 4B are totally a diagram illustrating a flowchart of processing to determine the display contents to be displayed on the UI screen of the display device 138 in FIG. 3. The flowchart of FIGS. 4A and 4B represents the processing to be executed by the CPU of each display device 138 based on the client program of the display device 138. The processing of the flowchart of FIGS. 4A and 4B is the processing to be carried out as follows. Specifically, each display device 138 obtains the client program provided by the processing unit 131 of the main controller 13A through the Web server, and the client program is executed by the CPU of the display device 138 or the browser of the display device 138 executes the processing based on the client program of the display device 138. In other words, the main controller 13A provides the program (SPA) to be executed by each display device 138.

The flowchart of FIGS. 4A and 4B illustrates the processing to allow the user to determine the display contents with reference to a status of the image formation apparatus 1 in the case of displaying an arbitrary UI screen concerning the image formation apparatus 1. To be more precise, the flowchart shows the processing to determine whether the arbitrary screen designated by the user is to be displayed without change or the display contents are to be switched automatically, and moreover, to determine the display contents to be switched in the case where the automatic switching is applied. Note that the expression "arbitrary screen" in the flowchart of FIGS. 4A and 4B represents the screen designated by the user. During the execution of an arbitrary function in the image formation apparatus 1, the apparatus status becomes a status corresponding to the function being executed. For example, in a case where a user A is executing a function of the apparatus, the display contents on the UI screen of a user B who is a non-executant may be automatically switched depending on the function being executed. Details of the processing of FIGS. 4A and 4B will be described later.

FIG. 5 shows an example of a category list indicating three categories (categories A, B, and C) of actions in the case of switching the display contents on the UI screen of the non-executant. The actions involving the display contents on the UI screen are defined mainly depending on whether or not the screen is to be forcibly switched. The categories A and B in FIG. 5 represent actions in which the UI screen of the non-executant is forcibly transitioned. The category C represents actions in which the UI screen of the non-executant is not forcibly transitioned. To be more precise, the category A (a first category) is a category in which the display contents on the UI screen after the forcible transition are different from the display contents on that of the executant of the function. Meanwhile, the category B (a second category) is a category in which the display contents on the UI screen after the forcible transition are the same as the display contents on that of the executant of the function. The category C (a third category) is a category in which the forcible transition of the screen is withheld but the display contents of the UI screen transition to the same display contents as those on the UI screen of the executant in a case where the non-executant manually switches the UI screen to the display of the UI screen concerning the function being executed. Although the three categories are explained as the example in this case, various other categories may be defined by further breaking down the categories A and B into more actions, for instance.

FIG. 6 is a correspondence list that shows the categories corresponding to statuses of the image formation apparatus 1 (hereinafter simply referred to as "apparatus statuses"). FIG. 6 shows "component replacing", "shutting down", "firmware updating", and "image quality maintenance ongoing" as examples of the apparatus statuses regarding the image formation apparatus 1 in the course of executing the functions. Moreover, these apparatus statuses are associated with the corresponding categories. Furthermore, screen information corresponding to each apparatus status is indicated in FIG. 6. For example, in the case of the category A, the screen information in FIG. 6 corresponds to information on the UI screen to be displayed to the non-executants. In the case of the category B, the screen information in FIG. 6 corresponds to information on the UI screen which is the same as the UI screen to be displayed to the executant. In the case of the category C, the screen information in FIG. 6 corresponds to information on a screen serving as a trigger for transitioning to a UI screen supposed to display the same contents as a UI screen of the executant, and information on the UI screen supposed to display the same contents as the UI screen of the executant. Specified apparatus statuses and details of screen operations by a non-executant will be described later.

Note that the information in the correspondence list in FIG. 6 is merely an example and the list may also include more information other than the information shown in FIG. 6. The correspondence among the apparatus statuses, the categories, and the screen information may be appropriately set in conformity to the usage of the apparatus. For example, the apparatus status may preferably be set to the category A in a case of a function of which authorization for operation should be concentrated only on the executant or in a case where information different from the information to the executant should be displayed to the non-executant while not allowing the non-executant to perform any operation. Here, the category A is desirable particularly in a case of a function that intends to ensure safety of all the users by restricting the operation by the non-executant.

The apparatus status may preferably be set to the category B in a case of a function for which the same contents should be forcibly displayed to the executant and the non-executants without distinction. Here, the category B is desirable particularly in a case of a function that brings about a significant change in the apparatus after execution of the function in order to allow all the users to share the same progress information.

The apparatus status may preferably be set to the category C in a case where the non-executants are allowed to conduct other operations and information display even during execution of a certain function. Here, the category C is desirable particularly in a case of a function that may cause a restriction of operation applicable to all the users for a long period, or in a case of a function of which priority of execution may vary depending the situation.

<Detailed Description of Flowchart>

Details of the flowchart of FIGS. 4A and 4B will be described. As mentioned above, the flowchart of FIGS. 4A and 4B represents the processing to cause the CPU of each display device 138 to execute the client program provided by the processing unit 131 of the main controller 13A and obtained through the Web server. To be more precise, this is the processing in which the not-illustrated CPU of each display device 138 activates and executes the program obtained through the Web server on the RAM. The processing of FIGS. 4A and 4B is executed by the CPU of the display device 138 based on the client program or is executed by the browser based on the client program of the display device 138. Note that a code "S" in the description of the processing represents a step in the flowchart (the same applies to the rest of this specification).

The processing of FIGS. 4A and 4B is the processing to be started by the client program and the browser of the display device 138 in the case where the user activates the browser of the display device 138. As mentioned above, the browser of each display device 138 is assumed to have already obtained the display sources for the respective UI screens in this example. In the meantime, the user is assumed to have logged in the UI screen and each client program is assumed to be capable of identifying the user (or the display device) displaying the UI screen based on identification information such as user information or other identification information such as a token and an IP address.

In S401, the display device 138 obtains various lists held by the display control unit 131b through the Web server. Specifically, the display control unit 131b of the main controller 13A transmits the various lists to each display device 138 through the Web server in response to a request from the display device 138. Here, the data are exchanged among the display device 138 and the status obtaining unit 131a as well as the display control unit 131b of the main controller 13A through the Web server. Accordingly, the expression "through the Web server" will be hereinafter omitted for the purpose of simplifying the description. The various lists obtained in S401 are the category list shown in FIG. 5 and the correspondence list shown in FIG. 6.

In S402, the display device 138 obtains the apparatus status at that time point from the status obtaining unit 131a. Specifically, the status obtaining unit 131a transmits the apparatus status to each display device 138 in response to a request from the display device 138. In S403, the display device 138 obtains from the status obtaining unit 131a user information on a user who has triggered the current apparatus status. Specifically, the status obtaining unit 131a transmits the user information on the user who has triggered the current apparatus status to each display device 138 in response to a request from the display device 138. The status obtaining unit 131a can transmit ID information identifying the user as the user information. Alternatively, the status obtaining unit 131a may receive the ID information on the user from each display device 138 and specify the user who has triggered the current apparatus status. Then, the status obtaining unit 131a may transmit information indicating whether each user is an executant or a non-executant to each display device 138 as the user information.

In S404, the display device 138 determines whether or not the executant is a person other than the person concerned based on the user information obtained in S403. Here, the "person concerned" is the user who is logging in the relevant display device 138. Regarding the display device 138a for instance, the display device 138a determines whether or not the user of the display device (such as the display device 138b) other than the display device of the person concerned is the executant. In the case where the person other than the person concerned is not the executant, that is, in the case where the person concerned is the executant, the processing proceeds to S414 where the display device 138 displays the arbitrary screen. As mentioned above, the "arbitrary screen" is the screen designated by the user. In the case where the processing proceeds to S414 as a result of the determination that the person concerned is the executant, the screen displayed in S414 corresponds to a screen the executant is executing. Note that specific examples of respective cases will be described later. Here, the description of details of the entire flowchart should be finished first.

The processing proceeds to S405 in the case where the person other than the person concerned is the executant as a result of determination in S404, or more specifically, in the case where the person concerned is the non-executant. In S405, the display device 138 determines whether or not it is appropriate to perform forcible screen transition by comparing the current apparatus status (such as the apparatus status obtained in S402) with the correspondence list of FIG. 6. The processing proceeds to S406 in the case of the determination that it is appropriate to perform the forcible screen transition while the processing proceeds to S413 in the case of the determination that it is not appropriate to perform the forcible screen transition. For example, the processing proceeds to S406 in the case of any of the category A and the category B where the non-executant is supposed to perform the forcible screen transition. In S406, the display device 138 determines whether or not the apparatus status represents a status where it is appropriate to perform transition to the same screen as that of the executant.

The processing proceeds to S407 in the case where the display device 138 determines in S406 that the apparatus status represents the status where it is appropriate to perform the transition to the same screen as that of the executant, and the processing proceeds to S410 in the case where the display device 138 determines in S406 that the apparatus status does not represent the status where it is appropriate to perform the transition to the same screen as that of the executant. For example, the processing proceeds to S407 in the case of the apparatus status corresponding to the category B, and the display device 138 displays the same screen as that of the executant described in a column of the screen information in FIG. 6. On the other hand, the processing proceeds to S410 in the case of the apparatus status corresponding to the category A, and the display device 138 displays the screen different from that of the executant.

In any of the cases of S407 and S410, the display device 138 obtains the apparatus status while displaying the corresponding screen (S408, S411), and determines whether or not there is a change in apparatus status as compared to the apparatus status obtained in S402 (S409, S412). The screen corresponding to each of the corresponding categories is continuously displayed in the case where there is no change in apparatus status. The processing returns to S403 in the case where there is a change in apparatus status. The determinations in S409 and S412 are executed on a regular basis. Here, the regular basis may be defined as regular intervals or may include intervals that are partially shifted from other execution timings.

Next, a description will be given of the processing in the case of determination in S405 that it is the apparatus status not appropriate for performing the forcible screen transition. In S413, the display device 138 determines whether or not the contents of the arbitrary screen designated by the user should be set to the same contents as those on the screen of the executant. To be more precise, in the case where the apparatus status belongs to the category C, the display device 138 determines whether or not the user designates a trigger screen described in the column of the screen information in the corresponding list of FIG. 6. In the case where the user designates the trigger screen described in the column of the screen information in the corresponding list of FIG. 6, the display device 138 determines that it is appropriate to display the same contents as those on the screen of the executant. The processing proceeds to S415 in the case of displaying the same contents as those of the screen of the executant, and the display device 138 displays the arbitrary screen designated by the user with the same contents as those on the screen of the executant. Note that the screen with the same contents as those on the screen of the executant are described as display items in the screen information in FIG. 6. Thereafter, the display device 138 obtains the apparatus status while displaying the screen (S416), and determines whether or not there is a change in apparatus status as compared to the apparatus status obtained in S402 (S417). The current screen is continuously displayed in the case where there is no change in apparatus status. The processing returns to S403 in the case where there is a change in apparatus status. In the meantime, in S417, the processing returns to S403 also in the case where there is an instruction of screen transition from a state of displaying the arbitrary screen designated by the user (the same contents as those on the screen of the executant) to another screen.

On the other hand, in the case where the user does not designate the trigger screen described in the column of the screen information in the corresponding list of FIG. 6 in S413, the display device 138 determines that it is not the apparatus status appropriate for displaying the same contents as those on the screen of the executant. The processing proceeds to S414 in the case of the apparatus status where it is not appropriate for displaying the same contents as those on the screen of the executant, and the display device 138 displays the arbitrary screen designated by the user. Note that the processing will be terminated if the user logs out in the course of displaying the various screens (S418).

The flowchart of FIGS. 4A and 4B has been described above. This embodiment shows the case where the screen information is included in the corresponding list of FIG. 6 and the screen information on the screen of the executant is obtained with reference to the corresponding list of FIG. 6. However, the screen information for the executant may be obtained and referred to separately in the case where the correspondence list of FIG. 6 does not include the screen information. In the flowing, handling of the processing in the flowchart of FIGS. 4A and 4B will be described while explaining specific examples of the respective categories.

<Specific Example of Category A>

Figure 7:
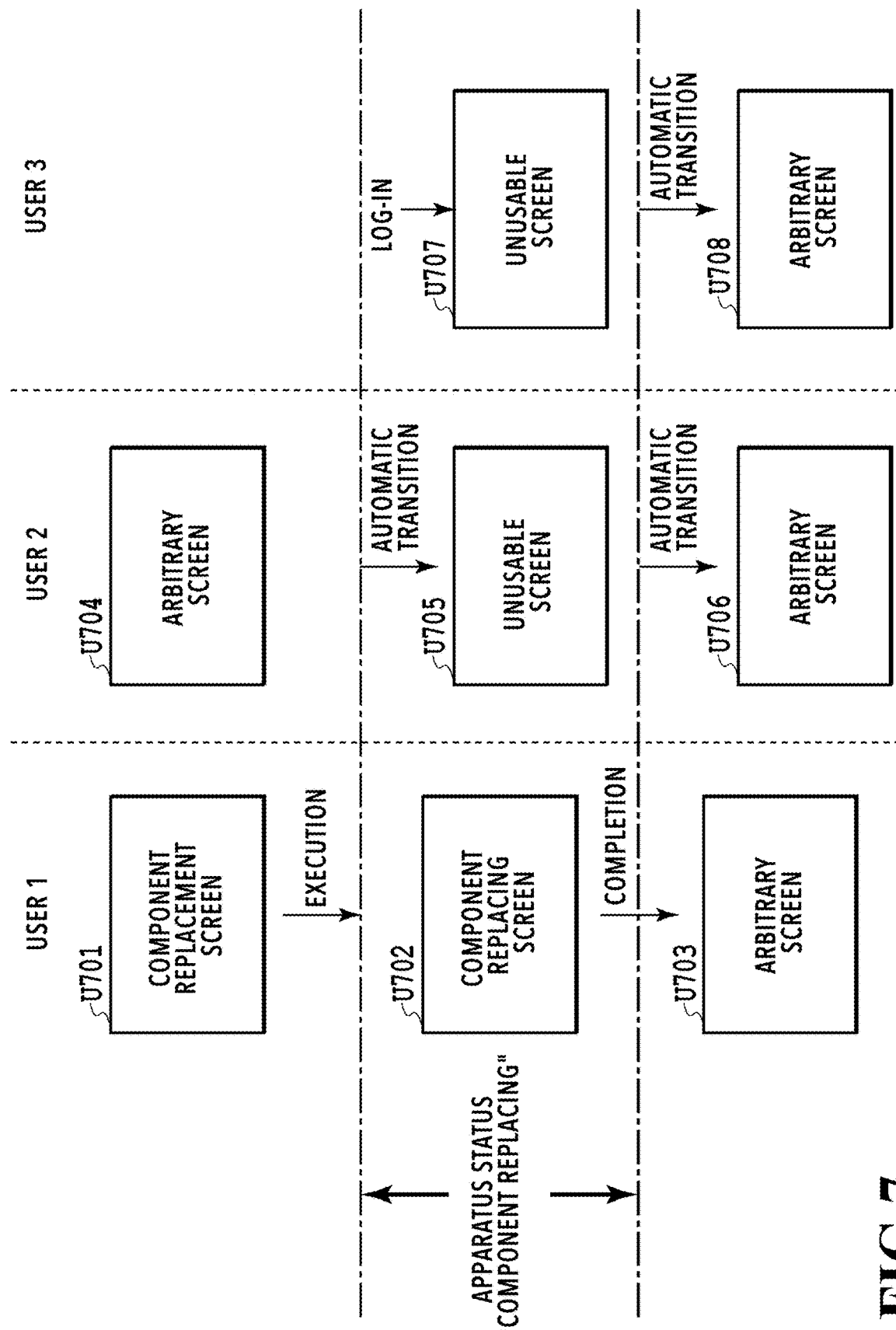
FIG. 7 is a diagram showing a specific example of a category A.

FIG. 7 shows a specific example of the category A in which the executant executes replacement of a component through the UI screen of the display device 138. As described previously, the category A represents an action to cause the forcible transition of the UI screen of the non-executant and the destination of the forcible transition is set to the screen different from the UI screen of the executant. In FIG. 7, a user 1 is the executant of a function while a user 2 and a user 3 are the non-executants of the function. FIG. 7 illustrates the transition of display on the UI screens of the display devices 138 of the respective users starting from the top.

As the user 1 performs an operation to execute component replacement on a "component replacement" screen (U701), the apparatus status of the image formation apparatus 1 is changed to a "component replacing" status. Then, the screen display for the user 1 is changed to a "component replacing" screen (U702). A space between two dashed lines in FIG. 7 represents a period in which the apparatus status is set to the "component replacing" status. With reference to the correspondence list of FIG. 6, the "component replacing" apparatus status belongs to the category A and the corresponding screen information is an "unusable" screen. Accordingly, as the apparatus status is changed to the "component replacing" status, the screen display for the user 2 which has been displaying an arbitrary screen (U704) since before the user 1 performs the operation to execute the component replacement forcibly transitions to an "unusable" screen (U705).

The control of the display contents for the user 2 will be described while applying the control to the flowchart of FIGS. 4A and 4B. The apparatus status obtained in S402 represents the "component replacing" status and the person other than the person concerned is determined to be the executant in S404. Moreover, the determination is made in S406 that it is not appropriate to perform transition to the same screen as that of the executant. As a consequence, this is a phase of displaying the screen in S410. In the case of the "component replacing" status as shown in FIG. 6, the "unusable" screen is displayed on the UI screen of each non-executant. Accordingly, the display device 138 of the user 2 displays the "unusable" screen. In the "unusable" screen, a sentence such as "CURRENTLY UNUSABLE DUE TO ONGOING COMPONENT REPLACEMENT" is displayed on the screen while disabling all the functions by not allowing to press all buttons thereon, for example. The replacement of a component is frequency carried out by the user who is the executant approaching the apparatus for performing a task. For this reason, such a performer may be endangered if another function is set out during the replacement of the component. Therefore, safety of the user being the executant can be secured by displaying the "unusable" screen and the like so as to inhibit the non-executants from using all the functions. In the case of the user 3 who logs in during the period of the "component replacing" status, an initial screen after the log-in is set to an "unusable" screen (U707).

While this embodiment describes the "unusable" screen as the example of the screen different from the screen of the executant in accordance with the correspondence list of FIG. 6, another screen not only displaying the above but also allowing settings and the like within a range not affecting the execution of the function may be displayed instead.

After completion of the component replacement by the user 1, the "component replacing" apparatus status is discontinued either by an operation to press an end button by the user 1 or by automatic end processing of the system. At this timing, the screen display for the user 1 is switched to an arbitrary screen (U703). The arbitrary screen (U703) may be the same screen display as U701 in order to design the ease of continuously executing the component replacement. The arbitrary screen (U703) may be another screen suitable for operability or safety of the user such as home screen display in order to design the ease of moving to a different operation.

The screen display of the user 2 and the user 3 automatically transitions to arbitrary screens (U706 and U708), respectively, at the timing of discontinuation of the "component replacing" apparatus status. In terms of the flowchart of FIGS. 4A and 4B, it is determined in S412 that the apparatus status obtained in S411 is changed from the "component replacing" status. In this case, it is determined in S404 that the person other than the person concerned has triggered the current apparatus status (hereinafter referred to as a "normal status"), and the processing proceeds to S405. In S405, it is determined to be not appropriate to perform the forcible transition (S405: NO) because the "normal status" is not included in the correspondence list shown in FIG. 6. Hence, the processing proceeds to S413. In S413, it is determined to be not appropriate to display the same contents as those on the screen of the executant (S413: NO) because the "normal status" is not included in the correspondence list of FIG. 6. Then, the processing proceeds to S414. This S414 represents the phase where the arbitrary screens (U706 and U708) are displayed. The arbitrary screen (U706) of the user 2 may display the same screen as the screen U704 before the forcible transition. The arbitrary screen (U708) of the user 3 may be the home screen display to be displayed after a normal log-in operation. Alternatively, the arbitrary screens (U706 and U708) may be screen display such as display of a list of replaced components representing detailed contents of the component replacement carried out by the user 1. Although this embodiment describes the example in which the same "unusable" screen is displayed to the user 2 and the user 3 who are the non-executants. Instead, the contents of display to the multiple non-executants may vary depending on the non-executants. Meanwhile, this embodiment describes the case in which the apparatus status obtained in S411 is the "normal status". However, the apparatus status obtained in S411 may be one of the apparatus statuses included in the correspondence list of FIG. 6. In that case, a display operation in accordance with the corresponding category may be carried out in S405 or S413.

<Specific Example of Category B>

Figure 8:
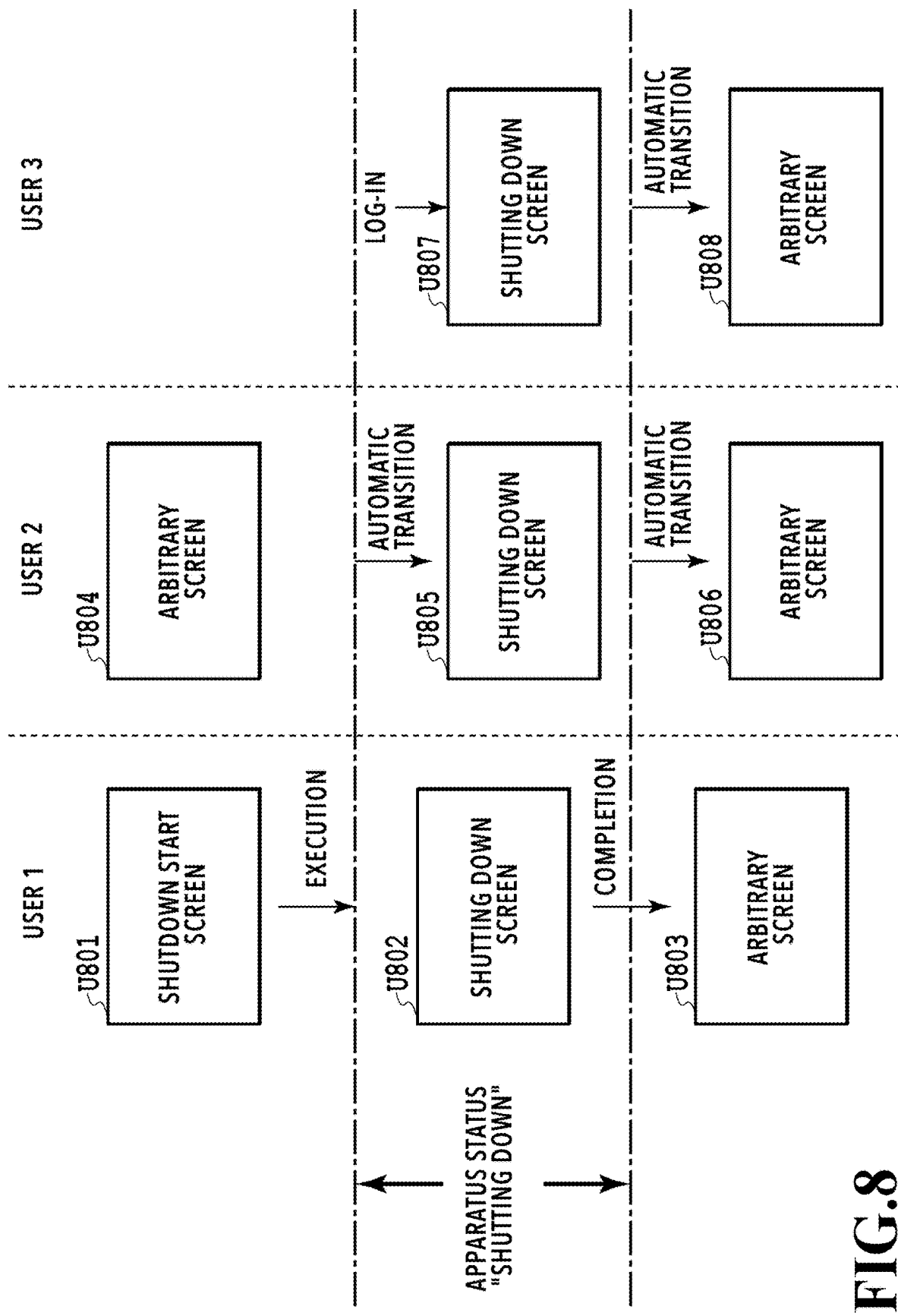
FIG. 8 is a diagram showing a specific example of a category B.

FIG. 8 shows a specific example of the category B in which the executant executes a shutdown through the UI screen of the display device 138. As described previously, the category B represents the example to cause the forcible transition of the UI screen of the non-executant and the destination of the forcible transition is set to the same screen as the UI screen of the executant. The user 1 is the executant of the function while the user 2 and the user 3 are the non-executants of the function. FIG. 8 illustrates the transition of display on the UI screens of the display devices 138 of the respective users starting from the top.

As the user 1 performs an operation to execute a shutdown on a "shutdown start" screen (U801), the apparatus status is changed to a "shutting down" status. Then, the screen display for the user 1 is changed to a "shutting down" screen (U802). A space between two dashed lines in FIG. 8 represents a period in which the apparatus status is set to the "shutting down" status. With reference to the correspondence list of FIG. 6, the "shutting down" apparatus status belongs to the category B. Accordingly, as the apparatus status is changed to the "shutting down" status, the screen display for the user 2 which has been displaying an arbitrary screen (U804) since before the user 1 performs the operation to execute the shutdown forcibly transitions to a "shutting down" screen (U805). The control of the display contents for the user 2 will be described while applying the control to the flowchart of FIGS. 4A and 4B. The apparatus status obtained in S402 represents the "shutting down" status and the person other than the person concerned is determined to be the executant in S404. Moreover, the determination is made in S406 that it is appropriate to perform transition to the same screen as that of the executant. As a consequence, this is a phase of displaying the same screen as that of the executant in S407. The "shutting down" screen displays the progress of the shutdown by using a percentage, remaining time, and the like. In the case where the apparatus shuts down, no user will be able to use the apparatus any more. By displaying the same "shutting down" screen as that of the executant, each non-executant can learn that the apparatus is shutting down and details of the remaining time and the like simultaneously. In the case of the new user 3 who logs in during the period of the "shutting down" status, an initial screen after the log-in is set to a "shutting down" screen (U807).

The main controller 13A is also terminated in the case of the shutdown where the image formation apparatus 1 is completely terminated. For this reason, as the shutdown of the apparatus is completed, the UI display of the apparatus on the display device 138 of every user is also terminated. However, in the case of only shutting down the print engine unit controlled by the engine controller 13B of the image formation apparatus 1, the main controller 13A remains activated and the UI display is continued on the display device 138 of every user. In this case, after completion of the shutdown of the apparatus, the "shutting down" apparatus status is discontinued either by an operation to press the end button by the user 1 or by automatic end processing of the system. At this timing, the screen display for the user 1 is switched to an arbitrary screen (U803). The arbitrary screen (U803) may be set to the home screen display or the like in order to design the ease of moving to another operation. This screen display may be formed into an appropriate screen while taking into account the operability of the user.

The screen display of the user 2 and the user 3 automatically transitions to arbitrary screens (U806 and U808), respectively, at the timing of discontinuation of the "shutting down" apparatus status. In terms of the flowchart of FIGS. 4A and 4B, it is determined in S409 that the apparatus status obtained in S408 is changed from the "shutting down" status and the screen is switched accordingly (S414). The processing that proceeds from the S409 to S414 has the flow of S404: YES, S405: NO, and S413: NO as described in conjunction with the category A. The arbitrary screen (U806) of the user 2 may display the same screen as the screen U804 before the automatic transition. The arbitrary screen (U808) of the user 3 may be the home screen display to be displayed after the normal log-in operation. These arbitrary screens (U806 and U808) may be any screens as long as the screens take the user operability or safety into account. Meanwhile, in the case where the status apparatus after the change in S409 is one of the apparatus statuses included in the correspondence list of FIG. 6, a display operation in accordance with the corresponding category may be carried out in S405 or S413.

<Specific Example of Category C>

Figure 9A:
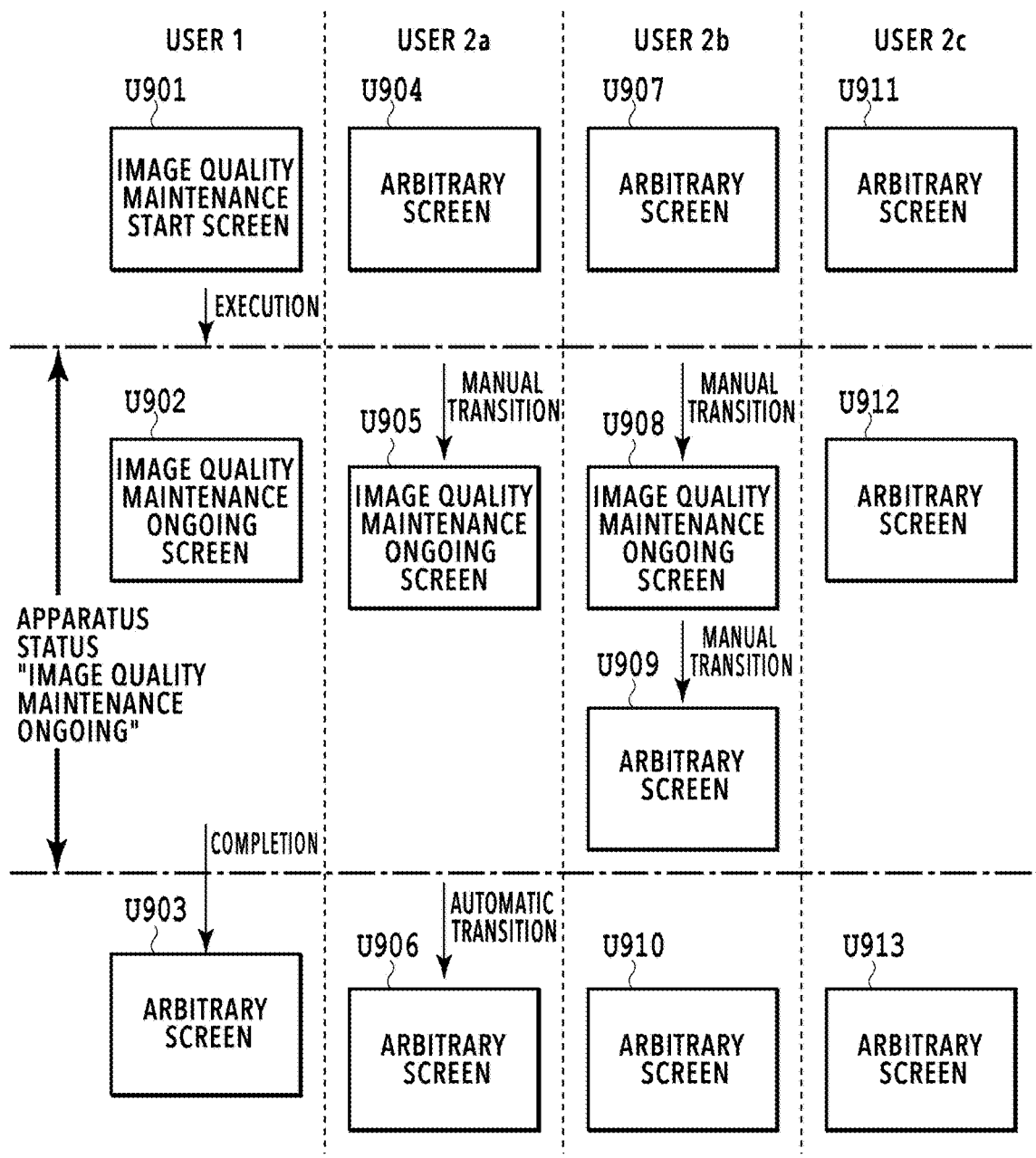
FIGS. 9A and 9B are totally a diagram showing a specific example of a category C.
Figure 9B:
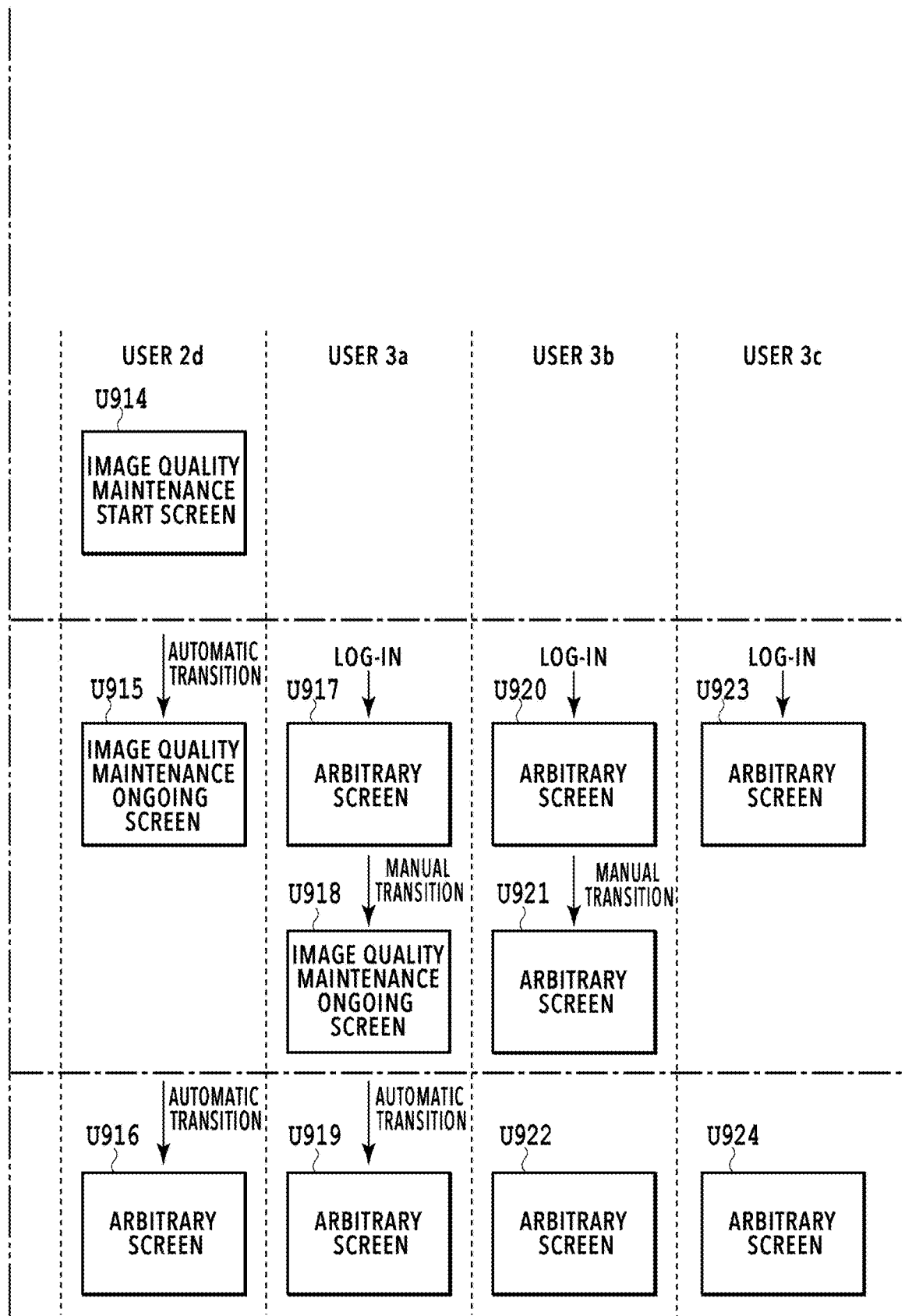

FIGS. 9A and 9B show a specific example of the category C in which the executant executes image quality maintenance through the UI screen of the display device 138. As described previously, the category C represents the category in which the forcible transition of the screen is withheld but the display contents of the UI screen transition to the same display contents as those on the UI screen of the executant in a case where the non-executant manually switches the UI screen to the display of the UI screen concerning the function being executed. Here, the image quality maintenance means a maintenance function for improving printing image quality. The user 1 is the executant of the function while a user 2a, a user 2b, a user 2c, a user 2d, a user 3a, a user 3b, and a user 3c are the non-executants of the function. FIGS. 9A and 9B illustrate the transition of display on the UI screens of the display devices 138 of the respective users starting from the top.

As the user 1 performs an operation to execute the image quality maintenance on an "image quality maintenance start" screen (U901), the apparatus status is changed to an "image quality maintenance ongoing" status and the screen display for the user 1 is changed to an "image quality maintenance ongoing" screen (U902). A space between two dashed lines in FIGS. 9A and 9B represents that the apparatus status is the "image quality maintenance ongoing" status. The user 2a, the user 2b, and the user 2c are the users who have been displaying arbitrary screens (U904, U907, and U911) since before the user 1 performs the operation to execute the image quality maintenance. The user 2d is the user who has been displaying an "image quality maintenance start" screen (U914) since before the user 1 performs the operation to execute the image quality maintenance. With reference to the correspondence list of FIG. 6, the "image quality maintenance ongoing" apparatus status belongs to the category C. Accordingly, even in the case where the apparatus status is changed to the "image quality maintenance ongoing" status, the screen display for the user 2a, the user 2b, and the user 2c is not forcibly switched. Only the screen display for the user 2d automatically transitions to the same "image quality maintenance ongoing" screen as that of the executant.

The processing of the display device 138 of each of the user 2a, the user 2b, and the user 2c will be described while applying the processing to the flowchart of FIGS. 4A and 4B. Although the apparatus status obtained in S402 represents the "image quality maintenance ongoing" status, the arbitrary screen designated by the user is not the trigger screen described in the column of the screen information in FIG. 6. As a consequence, this is a phase of displaying the screen in S414 reflecting the flow of S404: YES, S405: NO, and S413: NO.

The processing of the display device 138 of the user 2d will be described while applying the processing to the flowchart of FIGS. 4A and 4B. This corresponds to the case where the apparatus status obtained in S402 represents the "image quality maintenance ongoing" status and the screen designated by the user also corresponds to the trigger screen described in the column of the screen information in FIG. 6. As a consequence, this reflects the flow of S404: YES, S405: NO, and S413: YES. In other words, this is the phase of displaying the "image quality maintenance ongoing" screen in S415 based on the determination in S413 that it is appropriate to display the same contents as those on the screen of the executant. An "image quality maintenance ongoing" screen (U915) of the user 2d is the same screen as the "image quality maintenance ongoing" screen of the user 1.

The same "image quality maintenance ongoing" screens (U905 and U908) as that of the executant are displayed in the case where the user 2a and the user 2b manually transition to the "image quality maintenance start" screen during the period where the apparatus status is the "image quality maintenance ongoing" status. An arbitrary screen (U909) other than the "image quality maintenance start" screen is displayed if the user 2b manually transitions further to the arbitrary screen during the same period. Specifically, the instruction of screen transition is determined to be present in S417 and the processing proceeds to S414 where the arbitrary screen (U909) is displayed. As for the user 2c who does not manually transition to the "image quality maintenance start" screen during the same period, an arbitrary screen (U912) other than the "image quality maintenance ongoing" screen is constantly displayed. On the "image quality maintenance ongoing" screen, the progress of the image quality maintenance, for example, is displayed by using a percentage, remaining time, and the like. The image quality maintenance may require a long time for execution and may disable other functions during the execution. In this case, by displaying the same "image quality maintenance ongoing" screen as that of the executant to the non-executant, the non-executant can precisely learn when other functions will be available.

As for the user 3a, the user 3b, and the user 3c who are new users logging in during the period of the "image quality maintenance ongoing" apparatus status, arbitrary screens (U917, U920, and U923) such as a home screen are displayed on their display devices 138 after the log-in. As the user 3a manually transitions to the "image quality maintenance start" screen during the period in the "image quality maintenance ongoing" status, an "image quality maintenance ongoing" screen (U918) which is same as that of the executant is displayed. An arbitrary screen (U921) other than the "image quality maintenance start" screen is displayed as the user 3b manually transitions to the arbitrary screen during the same period. As for the user 3c who does not manually transition to the "image quality maintenance start" screen during the same period, an arbitrary screen (U923) other than the "image quality maintenance ongoing" screen is constantly displayed.

After completion of the image quality maintenance by the user 1, the "image quality maintenance ongoing" apparatus status is discontinued either by an operation to press the end button by the user 1 or by automatic end processing of the system. At this timing, the screen display for the user 1 is switched to an arbitrary screen (U903). The arbitrary screen (U903) may be the same screen display as U901 in order to design the ease of continuously executing the image quality maintenance. The arbitrary screen (U903) may be another screen suitable for operability or safety of the user such as the home screen display in order to design the ease of moving to a different operation.

The user 2a the user 2d, and the user 3a are the users who display the "image quality maintenance ongoing" screen during the period of the "image quality maintenance ongoing" apparatus status. These users automatically transition to arbitrary screens (U906, U916, and U919), respectively, at the timing of discontinuation of the "image quality maintenance ongoing" apparatus status. In terms of the flowchart of FIGS. 4A and 4B, this is a phase (S414) after switching the screen as a consequence of the determination in S417 that the apparatus status obtained in S416 is changed from the "image quality maintenance ongoing" status. Each of the arbitrary screens (U906, U916, and U919) of the users may be the home screen, or may be screen display such as display of details of a result of the image quality maintenance conducted by the user 1. The arbitrary screens (U906 and U916) of the user 2a and the user 2d may also be the arbitrary screens (U904 and U914) before the apparatus status transitions to the "image quality maintenance ongoing" status. In the case where the apparatus status after the change in S417 is one of the apparatus statuses included in the correspondence list of FIG. 6, a display operation in accordance with the corresponding category may possibly be carried out in S405 or S413. Regarding the user 2b, the user 2c, the user 3b, and the user 3c who display the arbitrary screens during the period of the "image quality maintenance ongoing" apparatus status, the contents of the arbitrary screens before and after the switching of the apparatus status from the "image quality maintenance ongoing" status remain the same. The detailed description of the respective categories has been completed.

<Examples of Screen Display Layouts>

Figure 10A:
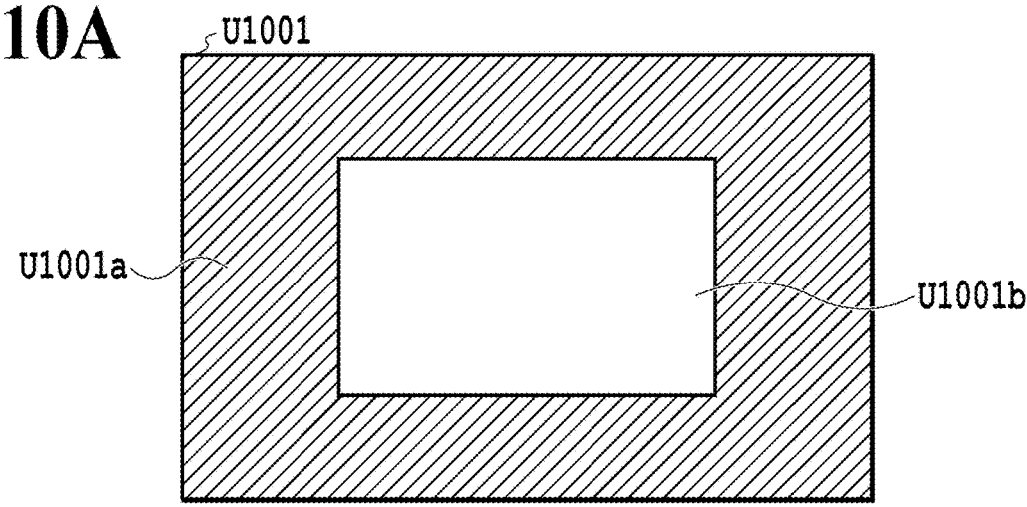
FIGS. 10A to 10C are diagrams showing examples of display layouts of a non-executant screen.
Figure 10B:
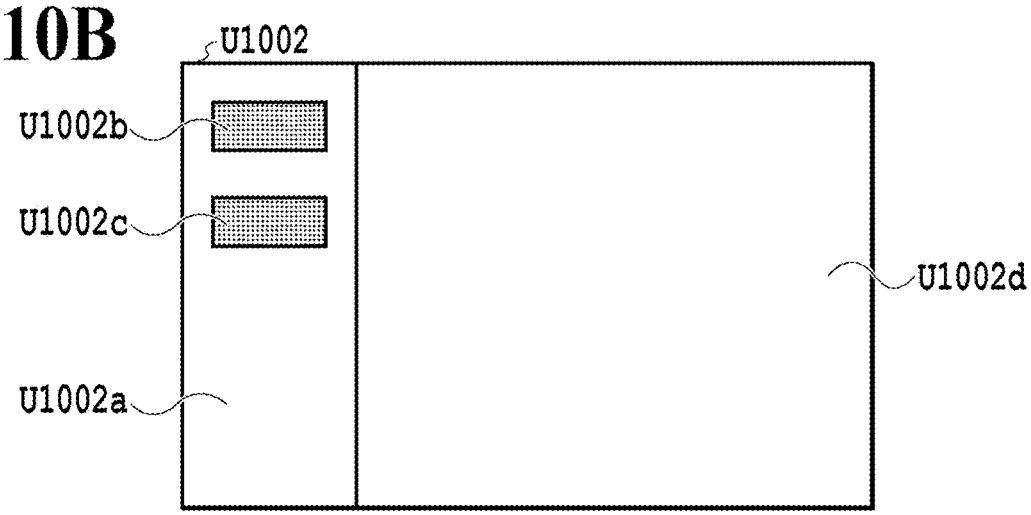
Figure 10C:
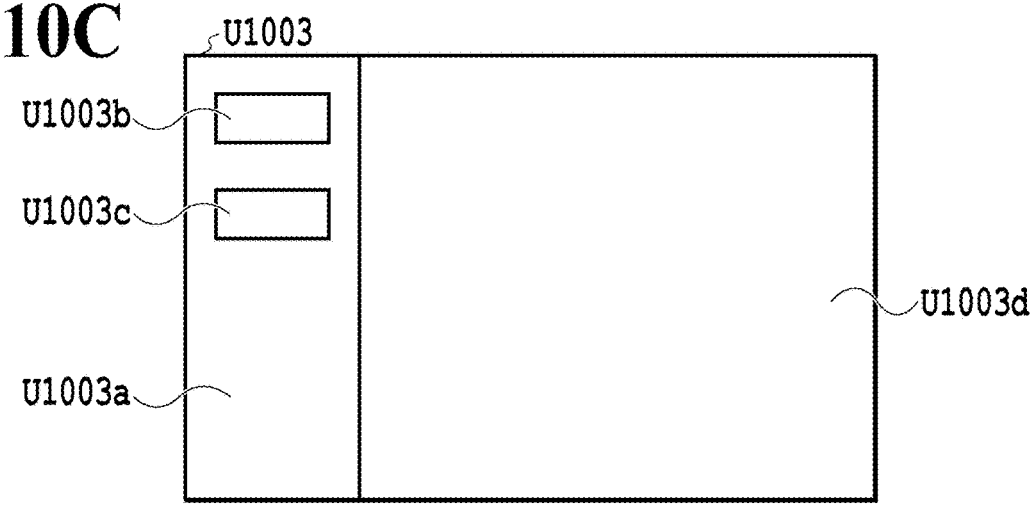

FIGS. 10A to 10C are diagrams showing examples of display layouts of the UI screen of the non-executant to be displayed on the browser of the display device 138. As described above, the display sources of the layout of the UI screen have been obtained by the display device 138 at the initial access to the Web server. The display control unit 131b has information used for defining whether or not it is appropriate to permit a different operation in accordance with each of the UI screens. Moreover, the client program of each display device 138 can restrict operations by determining a suitable screen from the obtained display sources in accordance with the apparatus status and causing the browser to display the determined screen.

A layout such as a screen U1001 shown in FIG. 10A or a screen U1002 shown in FIG. 10B is effective in the case of permitting only the information display concerning the function being executed but not permitting other operations to the non-executant. In the screen U1001, a normal screen is entirely masked as shown in a section U1001a and information display such as pop-up display is overlaid on an upper surface of the section U1001a as shown in a section U1001b. The client program of the display device 138 of the non-executant additionally displays the mask U1001a in the case where the browser displays the screen U1001. In this way, the display is masked as shown in the screen U1001 so that other operations can be restricted.

On the screen U1002 shown in FIG. 10B, a region U1002d represents a display region concerning the function being executed. A region U1002a represents a display region concerning other functions. Sections U1002b and U1002c represent execution buttons concerning other functions. The client program of the display device 138 of the non-executant performs the control in such a way as to be unable to press down the execution buttons U1002b and U1002c on the browser concerning other functions on the browser, and can thus restrict other operations. According to this display, it is not possible to start execution of other functions while the certain function is being executed. As a consequence, the executant will never be taken over by any other non-executants.

Nevertheless, there may be a case where any of the non-executants is required to execute another function during execution of the certain function. In this case, the non-executant can execute another function if the screen display of the non-executant is designed as a screen U1003 as shown in FIG. 10C. Although the screen U1003 has the same layout as the screen U1002 of FIG. 10B, execution buttons U1003b and U1003c concerning other functions can be pressed down. Accordingly, in the case of this display, it is possible to start execution of another function during execution of the certain function whereby the executant may be taken over by the non-executant.

Figure 11:
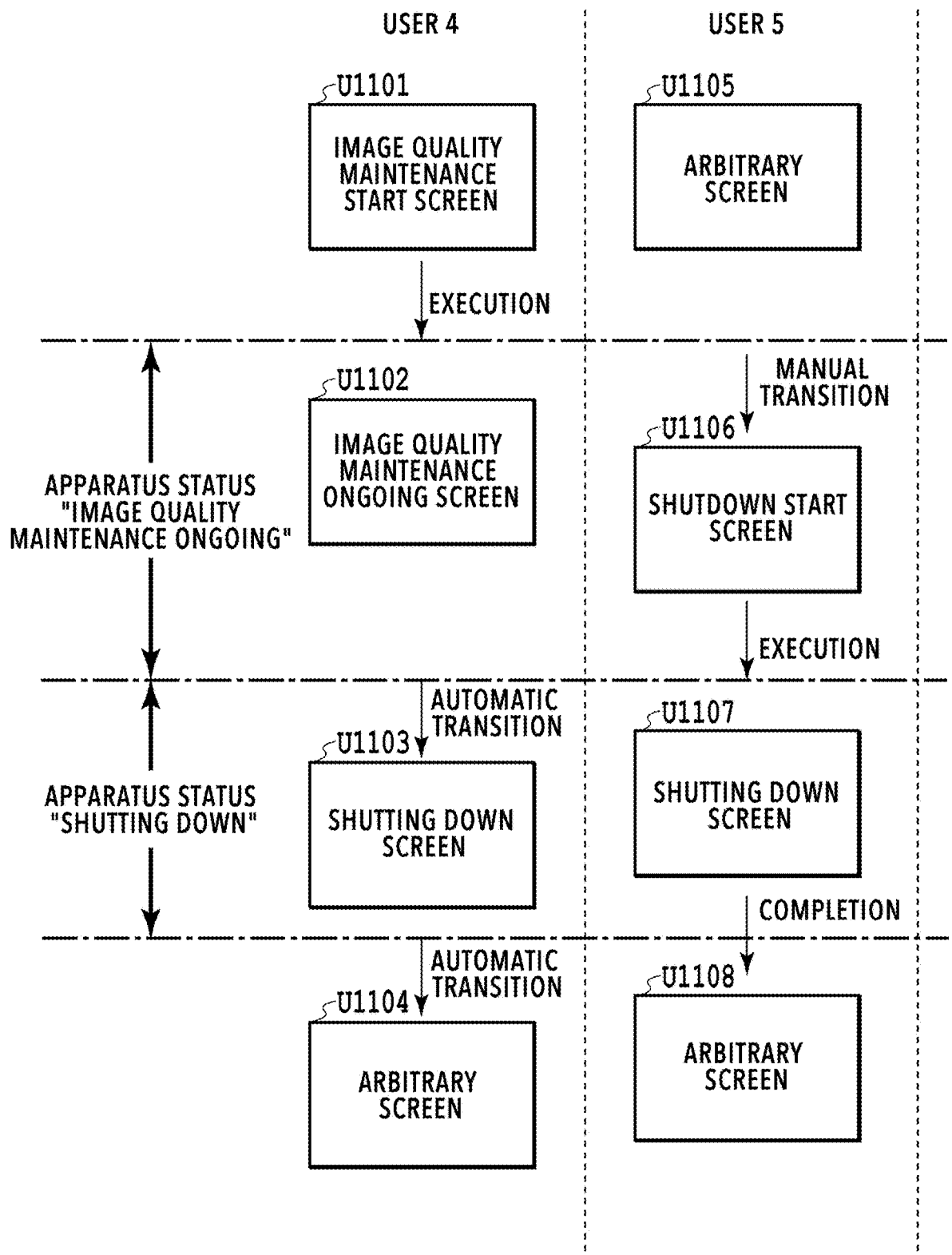
FIG. 11 is a diagram showing an example of switching UI display of an executant and of a non-executant.

FIG. 11 is a diagram showing a specific example of switching the screen display. As a user 4 executes the image quality maintenance from an "image quality maintenance start" screen (U1101), the apparatus status is changed to the "image quality maintenance ongoing" status. With reference to the correspondence list of FIG. 6, the "image quality maintenance ongoing" apparatus status belongs to the category C. Accordingly, a screen of a user 5 displaying an arbitrary screen (U1105) is not automatically switched. Here, in the case where UI display of the user 5 who is a non-executant of the function is the display as shown in the screen U1003 of FIG. 10C, the user 5 can execute other functions. For example, the apparatus is designed to allow execution of a shutdown function in the course of the "image quality maintenance ongoing" status. Here, the user 5 can execute the shutdown through a "shutdown start" screen (U1106) in the period of the "image quality maintenance ongoing" status. In this case, the apparatus status is changed to the "shutting down" status. Then, the display contents of the user 5 are switched to a "shutting down" screen while the screen of the user 4 who has been the executant of the image quality maintenance until just before this change is automatically switched to a "shutting down" screen for the non-executant. The display contents thereafter are the same as those in the aforementioned example.

Accordingly, it is possible to further improve user operability by selecting the display layout for the non-executant in accordance with a relationship of the functions of the apparatus.

As described above, this embodiment can control the display contents flexibly depending on the apparatus status. As a consequence, operability or safety of the user is improved. For example, it is possible to share the status of execution of the certain function with another user who is the non-executant other than the executant of the certain function. For instance, in the case where the apparatus is shut down after completion of a certain task, all the users cannot operate the apparatus after the shutdown. Therefore, all the users are required to share the information on the apparatus status at the point of start of the task. According to this embodiment, it is possible to control the display contents flexibly in accordance with the apparatus status, so that the information can be shared with the users other than the executant who executes the shutdown, for example.

Second Embodiment

The first embodiment has described the example of universally applying the corresponding list as shown in FIG. 6 to all the users. Meanwhile, this embodiment will describe an example in which the correspondence list is changed in accordance with user information. This makes it possible to control further flexible control of the display contents. Note that the system configuration of this embodiment is the same as that of the first embodiment and description thereof will be omitted.

Figure 12B:
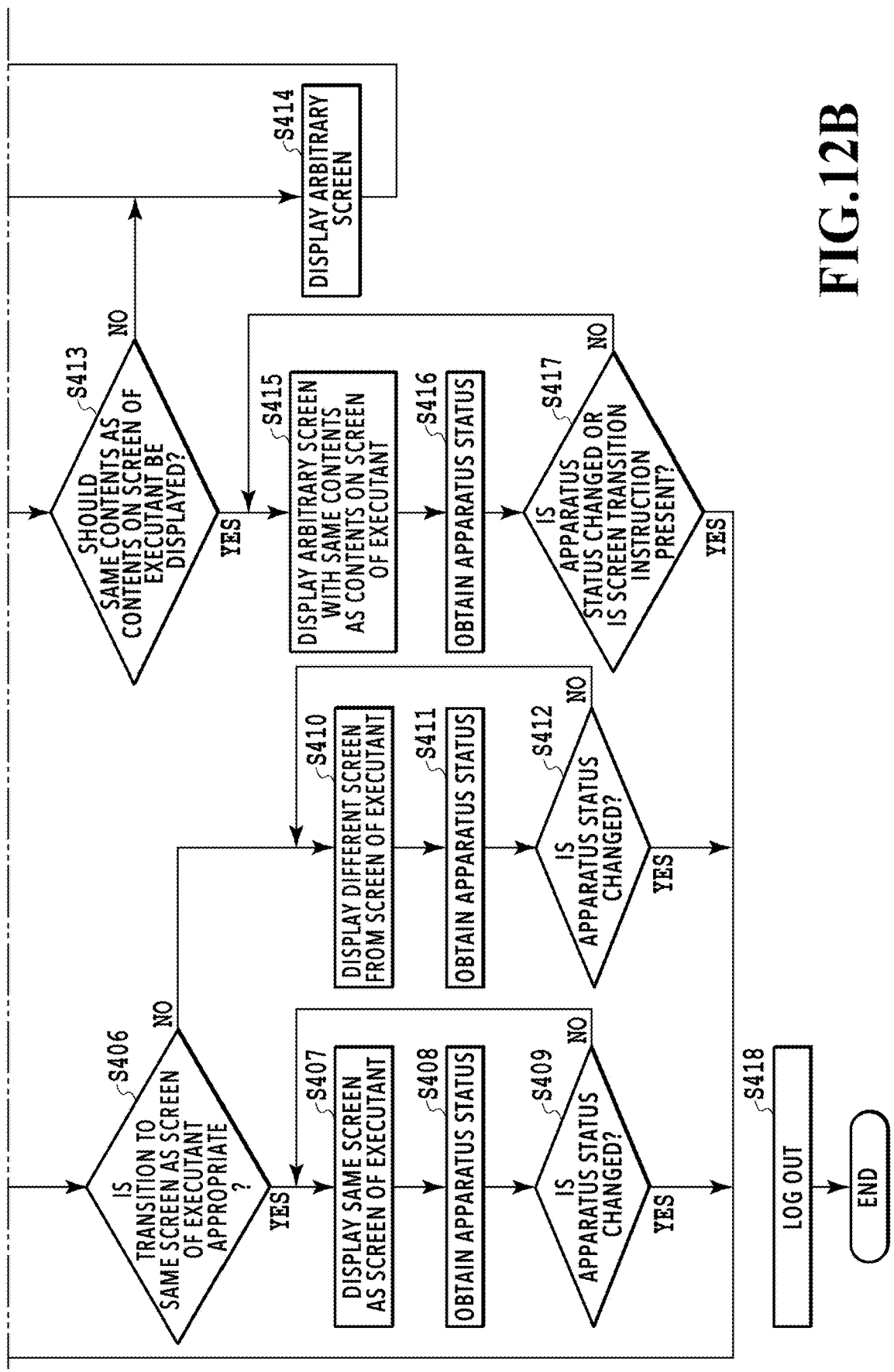

FIGS. 12A and 12B are totally a diagram showing an example of a flowchart of this embodiment. While FIGS. 12A and 12B basically illustrate processing that is similar to the flowchart shown in FIGS. 4A and 4B, a step of selecting an applicable list depending on the user information on the executant is added between S403 and S404. Thus, the display contents for the non-executant can be flexibly switched depending on the user information on the executant. Note that the user information to be obtained in S403 in this embodiment is not limited only to unique information such as ID information to identify the user but may be detailed user information including multiple types of information on the user. The other processing is the same as that in FIGS. 4A and 4B and the explanation thereof will be omitted while designating the same reference numerals instead.

One of examples of the user information used for selection of the applicable list is type information on the display devices 138 employed by the users. The multiple display devices 138 are present in FIG. 3. In the following, the UI of the display device connected directly to the main controller, such as the display device 138a in FIG. 3 among the multiple display devices 138, will be defined as a main UI. In the meantime, the UI of the display device 138b of the terminal device 140 connected to the main controller 13A through the communication OF 133 unlike the main UI will be defined as a remote UI.

The main UI is often located in the vicinity of the apparatus. Accordingly, an operation by using the main UI may have higher urgency or importance than an operation from the remote UI that is often located far. In this case, it is effective to change the applicable correspondence list by determining based on the user information whether a main UI user is the executant or the non-executant of the function. Here, as described in the first embodiment, each display device 138 is assumed to have required the correspondence list from the display control unit 131b in S401.

For example, a correspondence list of FIG. 13 is applied in the case where it is determined based on the user information obtained in S403 that the user who triggered the current apparatus status is the main UI user. In the correspondence list of FIG. 13, all the apparatus statuses are classified in the category A. By classifying all the apparatus statuses in the category A as mentioned above, it is possible to display the UI screen of the remote UI user who is the non-executant of the function, which is different from the UI screen of the main UI user who is the executant of the function.

On the other hand, a correspondence list of FIG. 14 is applied in the case where it is determined based on the user information obtained in S403 that the executant is the remote UI user. The correspondence list of FIG. 14 shows an example of changing the categories of the respective apparatus statuses depending on whether the non-executant is the remote UI user or the main UI user. The example shown in FIG. 14 is configured to classify all the apparatus statuses in the category C in the case where the non-executant is the main UI user. Accordingly, the main UI user can display the same screen as that of the executant or display an arbitrary screen although this user is the non-executant.

This example has described the case of selecting the applicable correspondence list by determining based on the user information whether the executant is the main UI user or the remote UI user. Next, a description will be given of an example in which the user information is information containing positional information on the user and the applicable list is selected based on the positional information. The positional information of the user can be obtained as the user information in a case where the display device 138 employed by the user has a position obtaining function such as a GPS. Various distances between each user and the apparatus are available by using the terminal device 140 that can display in a wireless environment.

Figure 15:
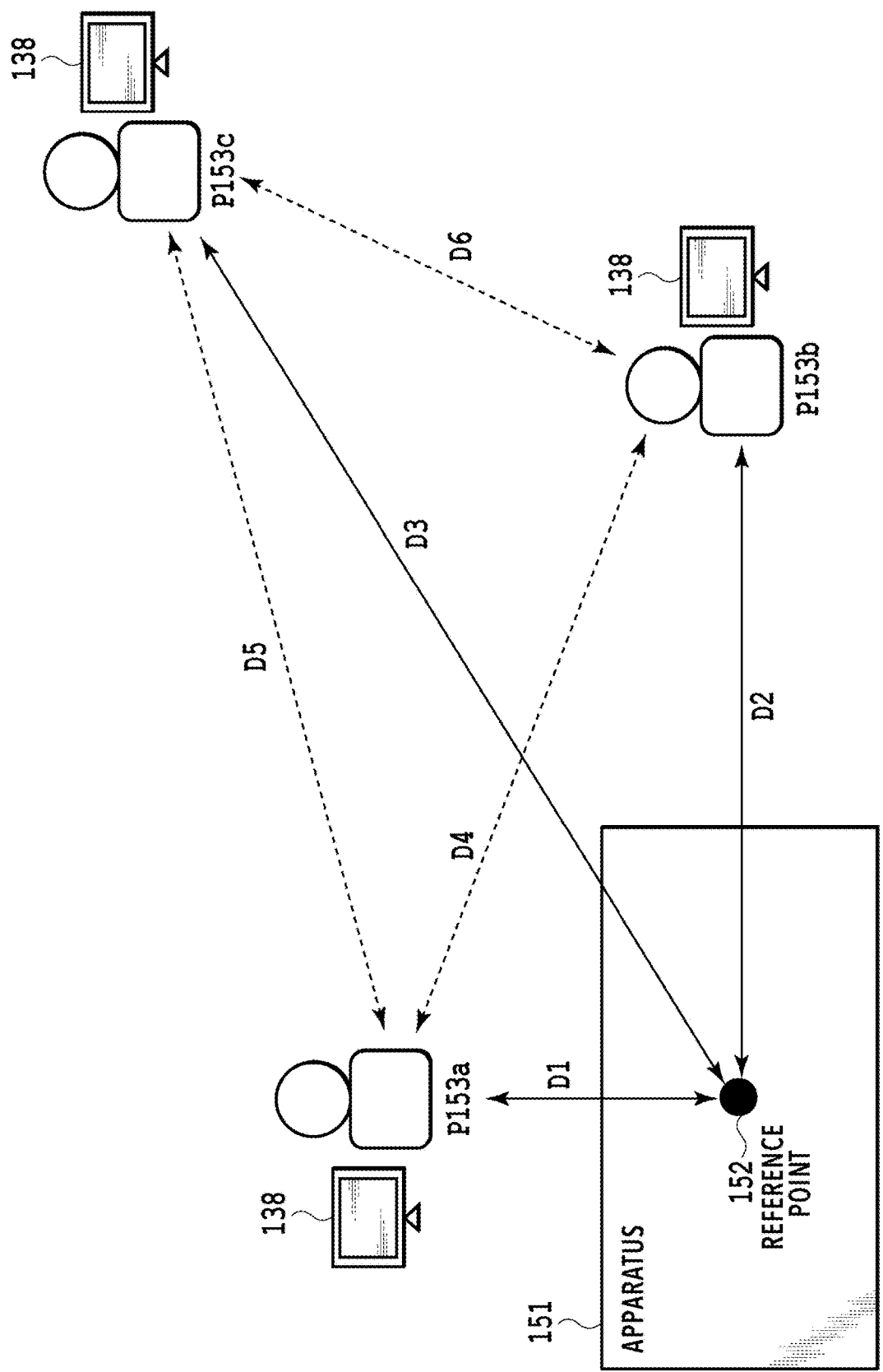
FIG. 15 is an image diagram showing positional relations between the apparatus and users.

FIG. 15 is an image diagram illustrating that multiple users (P153a, P153b, and P153c) each equipped with an individual display device 138 are located at various positions relative to an apparatus 151. The apparatus 151 may be the image formation apparatus 1 or any other apparatuses. Each user can be the executant or the non-executant. For example, the positional information on each user is defined as information on a distance of the user from a certain reference point. In this case, the distance information varies depending on a setting position of the reference point. In the case where the reference point is set inside the apparatus 151 like a reference point 152 in FIG. 15, the positional information is equivalent to information on the distance of the display device 138 of each user.

Assuming that the pieces of the information on the distances of the user P153a, the user P153b, and the user P153c from the reference point 152 are defined as D1, D2, and D3, respectively, a magnitude relation of the distances in the example of FIG. 15 satisfies D1<D2<D3. In the case where the user P153b becomes the executant of the function, the user P153a is located closer to the apparatus than the executant is while the user P153c is located farther from the apparatus than the executant is.

FIG. 16 shows an example of a correspondence list designed to switch the display contents for the non-executant depending on a result of comparison in distance with the position of the executant from the reference point 152 in the apparatus 151. Assuming the case where it is undesirable to allow the user located at the position farther from the position of installation of the apparatus 151 than the executant is to execute any operations at all, this condition is achieved by using the correspondence list in which the category A is set to all the apparatus statuses involving the user. In order to enable the user located at the position closer from the position of installation of the apparatus 151 than the executant is to perform the display or the operation equivalent to that of the executant, this condition is achieved by using the correspondence list in which the category B is set to all the apparatus statuses involving the user. The screen contents to be displayed may be changed depending on the distances of the multiple existing non-executants, respectively. For example, a message for avoiding danger such as "DANGER! KEEP AWAY FROM THE APPARATUS!" may be displayed on the screen of the non-executant who is present at a distance close to the apparatus and dangerous.

Alternatively, the position of the executant may be defined as the reference point. In the case where the user P153b is the executant of the function, the distances of the user P153a and the user P153c being the non-executants from the executant are defined as D4 and D6, respectively, and a magnitude relation of the distances satisfies D4>D6. The user P153c is closer to the user P153b being the executant than the user P153a is. Accordingly, the user P153c can directly communicate with the executant easily. As for the non-executant at the close distance from the executant, the same screen as that of the executant may be displayed in order to allow collaborative work with the executant even in the case where the non-executant is located at the position far from the apparatus 151. On the other hand, the user P153a may be closer to the apparatus 151 but is farther from the executant as compared to the other non-executant. In this case, it may be safer not to permit the user P153a to perform any operations.

FIG. 17 shows an example of a correspondence list designed to switch the categories depending on the distance from the executant. Although this example describes the case of switching the categories depending on whether or not the relevant non-executant is at the closest position to the executant, a reference value may be defined in terms of a value of the distance from the executant and the categories may be switched depending on whether or not the actual distance exceeds the reference value.

Meanwhile, other examples of the user information to be used for selecting the applicable list include an employed device, a user level, and so forth. The display contents may be switched depending on whether the device employed by the non-executant is a desktop PC, a tablet, or a smartphone. A user employing a smartphone may be subject to higher operation restrictions with this device as compared to users employing other devices. Alternatively, the user level may be set depending on the proficiency of each user and the display contents may be switched depending on the information on the user level. The same display as that of the executant may constantly be provided to a user at a high level, for instance.

In the meantime, the user information used for selecting the applicable corresponding list may be set by the user as appropriate, or the system may determine the optimal list by analyzing an operation history involving the user.

Meanwhile, instead of selecting the applicable correspondence list based on the information on the single user, the applicable correspondence list may be selected by combining pieces of the information on the multiple users. FIG. 18 shows an example of the user information containing all the items described so far. If the information contains the multiple items as shown in FIG. 18, it is possible to select the applicable correspondence list by combining the multiple items. Here, examples of the items of the user information include the user ID, the type, the positional information, the employed device, and the user level. The type represents information on the UI being used and includes information indicating whether the UI is the main UI, the remote UI, or the like. Of the positional information, an absolute position is the original positional information obtained by the GPS or the like, and a distance from the apparatus represents the distance from the reference point in the apparatus. The employed device represents any of the desktop, the tablet, the smartphone, and the like. The user level represents the level of the user expressed in a numerical value, for example. The display contents can be switched more flexibly by combining the multiple pieces of the user information, or more typically, by applying a correspondence list that does not give priority to the main UI if the executant who is the user of the main UI is located at a distant place from the apparatus, for instance.

The pieces of the user information described herein are mere examples, and other pieces of information serving as indices for identifying each user may also be used as the user information to be used for selecting the applicable list. The examples described in conjunction with the detailed contents of the applicable list are mere examples, and the contents may be flexibly set while taking into account how the apparatus is used, and the like. For instance, the contents of the image display for the non-executant may be selectable either individually or in a lump by the executant. Meanwhile, the contents of the image display for the non-executant may be selectable either individually or in a lump by the main UI user if this user is the executant. On the other hand, the contents may be selectable by the non-executant and the selected contents may be displayed after an approval by the executant.

Other Embodiments

The above-described embodiments have explained the image formation apparatus 1 as the example of the apparatus that allows reference to the status on the UI screens. However, apparatuses of other configurations may be applied instead. The apparatus only needs to be designed such that the functions of the apparatus can be referred to or controlled through multiple UI screens.

Meanwhile, the above-described embodiments have explained the example of adopting the SPA. Instead, the processing unit 131 of the main controller 13A may be configured to provide the display sources on a page-by-page basis to the display device 138 through the Web server. In this case, the respective procedures in the processing shown in FIGS. 4A and 4B (or FIGS. 12A and 12B) may be executed by the processing unit 131 on behalf of each of the display devices 138. For example, the processing unit 131 may obtain the information on the user of each display device 138 and the processing in S404 may be interpreted as the determination as to whether or not "the user other than the user of the display device targeted for the processing is the executant". Moreover, the processing unit 131 may control the display on the display device 138 in such a way as to display the screen determined in accordance with the apparatus status on the corresponding display device 138.

Meanwhile, the above-described embodiments have explained the example of determining the display contents based on the user information. Instead, the display contents may be determined based on information on the display device 138. For instance, in the case of determining the display contents based on the information on the display device 138 such as the information indicating the main UI or the remote UI as described in the second embodiment, the processing as described in the second embodiment may be executed in accordance with the information on (the type of) the display device 138, thereby determining the display contents. The same applies to the example of using the positional information on the display device 138. In this case, the processing may be designed to determine that the display device 138 represents the executant depending on whether or not the display device 138 is used for inputting the instruction to effectuate the transition to the apparatus status.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-147556, filed Aug. 9, 2019, which is hereby incorporated by reference wherein in its entirety.

What is claimed is:

1. A display control method of controlling a display content on a display device capable of displaying a screen concerning an apparatus, the method comprising the steps of:
obtaining an apparatus status of the apparatus; and
controlling the display content to be displayed on the display device, wherein
the controlling step includes, based on a fact that an instruction to cause the apparatus to transition to a first apparatus status is inputted from a different device from both the display device and the apparatus, whereby the apparatus status obtained in a state that the display device displays a first screen indicates the first apparatus status, causing the first screen displayed on the display device to automatically transition to a second screen which is controlled not to perform a function concerning the apparatus,
wherein, based on a fact that the apparatus is in the first apparatus status, the device displays a screen different from the second screen, and another display device which is different from both the device and the display device and which can display a screen concerning the apparatus displays the second screen.

2. The display control method according to claim 1, wherein
the obtaining step is executed on a regular basis.

3. The display control method according to claim 1, wherein
the first apparatus status is a status of being during replacement of a component.

4. The display control method according to claim 1, wherein
the controlling step includes, based on a fact that apparatus status obtained in a state that the display device displays the second screen indicates an apparatus status different from the first apparatus status, causing the second screen displayed on the display device to automatically transition to the first screen.

5. The display control method according to claim 1, wherein
the controlling step includes, based on a fact that an instruction to cause the apparatus to transition to a second apparatus status is inputted from the device, whereby the apparatus status obtained in a state that the display device displays a first screen indicates the second apparatus status, causing the first screen displayed on the display device to automatically transition to a third screen which is in accordance with the second apparatus status.

6. The display control method according to claim 5, wherein
the second apparatus status is a status of being during shutdown.

7. The display control method according to claim 5, wherein
based on a fact that the apparatus is in the second apparatus status, the device and another display device which is different from both the device and the display device and which can display a screen concerning the apparatus display the third screen.

8. The display control method according to claim 1, wherein
the controlling step includes, based on a fact that an instruction to cause the apparatus to transition to a third apparatus status is inputted from the device, whereby it is indicated that the apparatus status is the third apparatus status and the display device receives a user operation for displaying a screen concerning a function concerning the third apparatus status, causing the screen displayed on the display device to transition to a fourth screen which is in accordance with the third apparatus status.

9. The display control method according to claim 8, wherein
the third apparatus status is a status of being during image quality maintenance.

10. The display control method according to claim 8, wherein
based on a fact that the apparatus is in the third apparatus status, the device also displays the fourth screen.

11. The display control method according to claim 8, wherein
the controlling step includes, even in a case where the apparatus status obtained in a state that the display device displays a first screen indicates the third apparatus status, not causing the first screen displayed on the display device to automatically transition to the fourth screen.

12. The display control method according to claim 1, wherein
the apparatus is a printer.

13. The display control method according to claim 1, wherein
the second screen is a screen in accordance with the first apparatus status.

14. A display device capable of displaying a screen concerning an apparatus, the display device including a processor programmed by a stored program to comprise:
an obtaining unit configured to obtain an apparatus status of the apparatus; and
a control unit configured to control the display content to be displayed on the display device, wherein
based on a fact that an instruction to cause the apparatus to transition to a first apparatus status is inputted from a different device from both the display device and the apparatus, whereby the apparatus status obtained in a state that the display device displays a first screen indicates the first apparatus status, the control unit causes the first screen displayed on the display device to automatically transition to a second screen which is controlled not to perform a function concerning the apparatus,
wherein, based on a fact that the apparatus is in the first apparatus status, the device displays a screen different from the second screen, and another display device which is different from both the device and the display device and which can display a screen concerning the apparatus displays the second screen.

15. A display control system comprising:
an apparatus; and
a display device capable of displaying a screen concerning the apparatus, wherein
the display device includes a processor programmed by a stored program to comprise:
an obtaining unit configured to obtain an apparatus status of the apparatus, and a control unit configured to control the display content to be displayed on the display device, and wherein based on a fact that an instruction to cause the apparatus to transition to a first apparatus status is inputted from a different device from both the display device and the apparatus, whereby the apparatus status obtained in a state that the display device displays a first screen indicates the first apparatus status, the control unit causes the first screen displayed on the display device to automatically transition to a second screen which is controlled not to perform a function concerning the apparatus, wherein, based on a fact that the apparatus is in the first apparatus status, the device displays a screen different from the second screen, and another display device which is different from both the device and the display device and which can display a screen concerning the apparatus displays the second screen.

* * * * *